US008023823B2

(12) United States Patent
Bouda

(10) Patent No.: US 8,023,823 B2
(45) Date of Patent: Sep. 20, 2011

(54) SYSTEM AND METHOD FOR TRANSMITTING UPSTREAM TRAFFIC IN AN OPTICAL NETWORK

(75) Inventor: Martin Bouda, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1246 days.

(21) Appl. No.: 11/426,875

(22) Filed: Jun. 27, 2006

(65) Prior Publication Data

US 2007/0092254 A1    Apr. 26, 2007

Related U.S. Application Data

(63) Continuation-in-part of application No. 11/347,434, filed on Feb. 3, 2006, now Pat. No. 7,546,036.

(60) Provisional application No. 60/729,447, filed on Oct. 20, 2005, provisional application No. 60/756,925, filed on Jan. 6, 2006, provisional application No. 60/803,792, filed on Jun. 2, 2006.

(51) Int. Cl.
*H04J 14/00* (2006.01)

(52) U.S. Cl. .............................. 398/72; 398/67; 398/71

(58) Field of Classification Search .............. 398/66–67, 398/71–74

See application file for complete search history.

(56) References Cited

U.S. PATENT DOCUMENTS

| 4,555,810 | A | 11/1985 | Khoe et al. | |
|---|---|---|---|---|
| 5,285,305 | A | 2/1994 | Cohen et al. | |
| 5,321,541 | A | 6/1994 | Cohen | 359/127 |
| 5,440,416 | A | 8/1995 | Cohen et al. | 359/127 |
| 5,579,421 | A | 11/1996 | Duvall et al. | |
| 5,694,234 | A | 12/1997 | Darcie et al. | 359/125 |
| 5,926,298 | A | 7/1999 | Li | 359/120 |
| 6,144,472 | A | 11/2000 | Knox | 359/127 |
| 6,163,637 | A | 12/2000 | Zirngibl | 385/37 |
| 6,411,410 | B1 | 6/2002 | Wright et al. | |

(Continued)

FOREIGN PATENT DOCUMENTS

EP    1 028 331 A2    8/2000

(Continued)

OTHER PUBLICATIONS

ITU-T Telecommunication Standardization Sector of ITU-T, G.984.3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.

(Continued)

*Primary Examiner* — Dzung Tran
(74) *Attorney, Agent, or Firm* — Baker Botts L.L.P.

(57) ABSTRACT

In accordance with the teachings of the present invention, a system and method for transmitting upstream traffic in an optical network is provided. In a particular embodiment, the method includes transmitting upstream traffic at a first wavelength from a first downstream terminal to a distribution node and transmitting upstream traffic at a second wavelength from a second downstream terminal to the distribution node. The method also includes combining the upstream traffic in the first wavelength and the upstream traffic in the second wavelength at a coupler in the distribution node without multiplexing the upstream traffic in the first wavelength and the upstream traffic in the second wavelength. The method also includes forwarding the combined traffic from the distribution node to a single upstream terminal.

10 Claims, 5 Drawing Sheets

U.S. PATENT DOCUMENTS

| | | | |
|---|---|---|---|
| 6,498,876 B1 | 12/2002 | Liu et al. | 385/34 |
| 6,767,139 B2 | 7/2004 | Brun et al. | 385/84 |
| 7,245,829 B1 | 7/2007 | Sindile | |
| 7,366,415 B2 | 4/2008 | Lee et al. | 398/66 |
| 7,389,048 B2 | 6/2008 | Kani et al. | |
| 7,684,703 B2 | 3/2010 | Harada | 398/68 |
| 2002/0061163 A1* | 5/2002 | Bartur et al. | 385/24 |
| 2002/0145775 A1* | 10/2002 | Effenberger et al. | 359/123 |
| 2002/0196491 A1 | 12/2002 | Deng et al. | |
| 2003/0002102 A1 | 1/2003 | Khalfallah et al. | |
| 2004/0001718 A1 | 1/2004 | Matthews et al. | |
| 2004/0131357 A1 | 7/2004 | Farmer et al. | |
| 2004/0175177 A1* | 9/2004 | Lee et al. | 398/72 |
| 2004/0184806 A1 | 9/2004 | Lee et al. | |
| 2004/0223763 A1* | 11/2004 | Lee et al. | 398/78 |
| 2005/0129400 A1* | 6/2005 | Kim et al. | 398/67 |
| 2005/0129404 A1 | 6/2005 | Kim et al. | 398/84 |
| 2005/0158048 A1 | 7/2005 | Sung et al. | 398/66 |
| 2005/0175343 A1 | 8/2005 | Huang et al. | |
| 2005/0175344 A1 | 8/2005 | Huang et al. | |
| 2005/0180689 A1 | 8/2005 | Kozhevnikov et al. | |
| 2006/0056849 A1 | 3/2006 | Pamart et al. | |
| 2006/0067692 A1* | 3/2006 | Park et al. | 398/75 |
| 2006/0083515 A1* | 4/2006 | Hann et al. | 398/87 |
| 2006/0115271 A1* | 6/2006 | Hwang et al. | 398/72 |
| 2006/0153567 A1 | 7/2006 | Kim et al. | |
| 2006/0222365 A1 | 10/2006 | Jung et al. | 398/72 |
| 2007/0092249 A1 | 4/2007 | Akasaka et al. | |
| 2007/0092250 A1 | 4/2007 | Bouda et al. | |
| 2007/0092251 A1 | 4/2007 | Bouda et al. | |
| 2007/0092252 A1 | 4/2007 | Bouda et al. | |
| 2007/0092253 A1 | 4/2007 | Bouda | |
| 2007/0092254 A1 | 4/2007 | Bouda | |
| 2007/0092255 A1 | 4/2007 | Bouda | |
| 2007/0166037 A1 | 7/2007 | Bouda et al. | |
| 2007/0166043 A1 | 7/2007 | Bouda | |
| 2007/0183779 A1 | 8/2007 | Bouda | |
| 2007/0280690 A1 | 12/2007 | Bouda | |
| 2007/0280691 A1 | 12/2007 | Bouda | |

FOREIGN PATENT DOCUMENTS

| | | |
|---|---|---|
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

ITU-T Telecommunication Standardization Sector of ITU-T, G.984.3, Series G: Study Period 2005-2008, "Updated Revised Amendment 1, : Amendment to Gigabit-Capable Passive Optical Network (G-PON): Transmission Convergence Layer Specification (2004)," pp. 1-39, May 16-27, 2005.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON;" Korea Advanced Institute of Science and Technology; 2005 Optical Society of America, 3 Pages, Mar. 6, 2005.

Smith, Stephen, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.

Suzuki et al.; "A Reliable Wide-Area WDM-PON Using Wavelength-Shifted Protection Scheme;" Access Network Service Systems Laboratories, NTT Corporation; 2 pages, Sep. 25, 2005.

ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15, 2001 through Oct. 26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks;" Department of Information Engineering, The Chinese University of Hong Kong; 3 pages, Mar. 6, 2005.

Hirth, Ryan, "1 Gbps to 10 Gbps Migration," Teknovus, Access the Future, IEEE Meeting, Jul. 2006, San Diego, CA, pp. 1-7, Jul. 2006.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol., part 1, pp. 141-147, Jan. 1, 1999.

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.

Bouda, "A Hybrid Passive Optical Network Using Shared Wavelengths," filed Feb. 3, 2006, 64 pps. 9 pps. drawings, U.S. Appl. No. 11/347,434.

Bouda, "System and Method for Transmitting Traffic in a Plurality of Passive Optical Networks," filed Jan. 26, 2007, 35 pps, 5 drawings, U.S. Appl. No. 11/627,793.

Bouda, "System and Method for Managing Different Transmission Architectures in a Passive Optical Network," U.S. Appl. No. 11/627,793, 42 pps., 4 pps. drawings, filed Jan. 26, 2007.

Bouda et al., "Method and System for Increasing Downstream Bandwidth in an Optical Network," filed Jan. 5, 2007, 42 pps., 10 pps. drawings, U.S. Appl. No. 11/620,144.

Bouda, "Distribution Node for an Optical Network," filed Jan. 4, 2007, 38 pps., 6 pps. drawings, U.S. Appl. No. 11/619,945.

Akasaka et al., "System and Method for Protecting an Optical Network," filed Dec. 11, 2006, 42 pps., 4 pps. drawings, U.S. Appl. No. 11/609,120.

Bouda et al., "System and Method for Extending Reach in a Passive Optical Network," filed Jan. 31, 2007, 51 pps, 5 pps. drawings, U.S. Appl. No. 11/669,657.

Bouda, "System and Method for Transmitting Optical Markers in a Passive Optical Network System," 52 pps., 5 pps. drawings, filed Jan. 31, 2007, U.S. Appl. No. 11/669,667.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al.., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

Son, et al., Bidirectional WDM Passive Optical Network for Simultaneous Transmission of Data and Digital Broadcast Video Service, *Journal of Lightwave Technology*, vol. 21, No. 8, © 2003 IEEE, pp. 1723-1727, Aug. 2003.

Ching, et al., *Passive Optical Networks, Sharing the Fiber*, Merrill Lynch & Co. (27 pages), May 15, 2001.

Kuhlow, et al., AWG-Based Device for a WDM Overlay PON in the 1.5-μm Bank, *IEEE Photonics Technology Letters*, vol. 11, No. 2, © 1999 IEEE, pp. 218-220, Feb. 1999.

Feldman, et al., An Evaluation of Architectures Incorporating Wavelength Division Multiplexing for Broad-Bank Fiber Access, *Journal of Lightwave Technology*, vol. 16, No. 9, © 1998 IEEE, pp. 1546-1559, Sep. 1998.

Giles, et al., Access PON Using Downstream 1550-nm WDM Routing and Upstream 1300-nm SCMA Combining Through a Fiber-Grating Router, *IEEE Photonics Technology Letters*, vol. 8, No. 11, © 1996 IEEE, pp. 1549-1551, Nov. 1996.

Hilbk, et al., High Capacity WDM Overlay on a Passive Optical Network, *Electronics Letters*, vol. 32, No. 23, pp. 2162-2163, Nov. 7, 1996.

Inoue, et al., Silica-based Arrayed-Waveguide Grating Circuit as Optical Splitter/Router, *Electronics Letters*, vol. 31, No. 9, pp. 726-727, Apr. 27, 1995.

Kashima, Upgrade of Passive Optical Subscriber Network, *Journal of Lightwave Technology*, vol. 9, No. 1, © 1991 IEEE, pp. 113-120, Jan. 1991.

Lin, Passive Optical Subscriber Loops with Multiaccess, *Journal of Lightwave Technology*, vol. 7, No. 11, © 1989 IEEE, pp. 1769-1777, Nov. 1989.

(Mems)* Singlemode Fiber Optic Switch, FO5935, MOOG Components Group (2 pages), © 2005.

PON & FTTx Update, *Light Reading*, (11 pages), Aug. 8, 2005.

ITU-T Telecommunication Standardization Sector of ITU, G.984.1, Series G: Transmission Systems and Media, Digital Systems and Networks, Digital sections and digital line system—Optical line systems for local and access networks, *Gigabit-capable Passive Optical Networks (GPON): General Characteristics.* (20 pages), Mar. 2003.

ITU-T Telecommunication Standardization Sector of ITU, G.983.1, Series G: Transmission Systems and Media, Digital Systems and Networks, Digital sections and digital line system—Optical line systems for local and access networks, *Broadband Optical Access Systems Based on Passive Optical Networks* (117 pages), Jan. 2005.

ITU-T Telecommunication Standardization Sector of ITU, G.983.3, Series G: Transmission Systems and Media, Digital Systems and Networks, Digital sections and digital line system—Optical line systems for local and access networks, *A Broadband Optical Access Systems with Increased Service Capability by Wavelength Allocation* (52 pages), Mar. 2001.

Green, Paul E., Jr., *Fiber-to-the-Home White Paper*, 21 pgs., Feb. 21, 2003.

Bouda, *A Distribution Node for a Wavelength-Sharing Network*, U.S. Appl. No. 11/347,612, filed Feb. 3, 2006.

Bouda, et al., *Distribution Components for a Wavelength-Sharing Network*, U.S. Appl. No. 11/347,585, filed Feb. 3, 2006.

Bouda, et al., *Upgradeable Passive Optical Network*, U.S. Appl. No. 11/347,446, filed Feb. 3, 2006.

Bouda, *System and Method for Traffic Distribution in an Optical Network*, U.S. Appl. No. 11/426,884, filed Jun. 27, 2006.

Bouda, *System and Method for Distributing Traffic in an Optical Network*, U.S. Appl. No. 11/426,879, filed Jun. 27, 2006.

* cited by examiner

SYSTEM AND METHOD FOR TRANSMITTING UPSTREAM TRAFFIC IN AN OPTICAL NETWORK

CROSS-REFERENCE TO RELATED APPLICATIONS

This application is a Continuation-in-Part of application Ser. No. 11/347,434 filed Feb. 3, 2006 now U.S. Pat. No. 7,546,036 by Bouda, et al., and entitled Hybrid Passive Optical Network Using Shared Wavelengths, which claims benefit under 35 U.S.C. §119(e) of U.S. Provisional Application Ser. No. 60/729,447 filed Oct. 20, 2005 by Bouda et al., and entitled Passive Optical Network Using Shared Wavelengths; and U.S. Provisional Application Ser. No. 60/756,925 filed Jan. 6, 2006 by Bouda, et al. and entitled Hybrid Passive Optical Network Components. This application also claims benefit under 35 U.S.C. §119(e) of U.S. Provisional Application Ser. No. 60/729,447 filed Oct. 20, 2005 by Bouda et al., and entitled Passive Optical Network Using Shared Wavelengths; U.S. Provisional Application Ser. No. 60/756,925 filed Jan. 6, 2006 by Bouda, et al. and entitled Hybrid Passive Optical Network Components; and U.S. Provisional Application Ser. No. 60/803,792 filed Jun. 2, 2006 by Bouda and entitled System and Method for Transmitting Upstream Traffic in an Optical Network.

TECHNICAL FIELD

The present invention relates generally to communication systems and, more particularly, to a system and method for transmitting upstream traffic in an optical network.

BACKGROUND

In recent years, a bottlenecking of communication networks has occurred in the portion of the network known as the access network. Bandwidth on longhaul optical networks has increased sharply through new technologies such as WDM and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (GB/s) by using more powerful transmitters, providing even greater bandwidth. Other PSPONs include, for example, asynchronous transfer mode PONs (APONs) and gigabit Ethernet PONs (GE-PONs).

Although PSPON systems have increased bandwidth in access networks, demand continues to grow for increased bandwidth. Although some cost-effective solutions have been proposed for increasing bandwidth in the downstream direction, such as wavelength-shared hybrid PONs (WS-HPONs), few cost-effective solutions have been proposed for increasing upstream capacity.

One upstream solution, wavelength division multiplexing PON (WDMPON), would increase upstream (and downstream) capacity dramatically but inefficiently. WDMPONs refer to access networks in which each ONU receives and transmits traffic over a dedicated downstream and upstream wavelength, respectively. Although WDMPONs would increase capacity dramatically, they would do so at a prohibitively high cost for many operators and would supply capacity far exceeding current or near-future demand. Because demand for greater upstream capacity continues to grow (but not at a rate to justify adoption of WDMPONs in most cases), a need exists for cost-efficient solutions along the upgrade path from PS-PONs to full WDMPONs.

SUMMARY

In accordance with the teachings of the present invention, a system and method for transmitting upstream traffic in an optical network is provided. In a particular embodiment, the method includes transmitting upstream traffic at a first wavelength from a first downstream terminal to a distribution node and transmitting upstream traffic at a second wavelength from a second downstream terminal to the distribution node. The method also includes combining the upstream traffic in the first wavelength and the upstream traffic in the second wavelength at a coupler in the distribution node without multiplexing the upstream traffic in the first wavelength and the upstream traffic in the second wavelength. The method also includes forwarding the combined traffic from the distribution node to a single upstream terminal.

Technical advantages of one or more embodiments of the present invention may include increasing upstream bandwidth in PSPONs and HPONs, potentially extending the life of these systems. In addition, particular embodiments may use cost-effective and reliable technology. Particular embodiments may also reuse many optical components, decreasing costs associated with the upgrade in upstream capacity. Reused optical components may include, for example, PSPON distribution nodes or HPON distribution nodes. Providing an upgrade path for upstream capacity between PSPONs and full WDMPONs may also allow network operators to more closely tailor increases in capacity in their networks with demand for that capacity. In addition, in particular embodiments, network operators may implement different types of ONU deployment strategies, allowing customers to differentiate themselves from their competitors.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
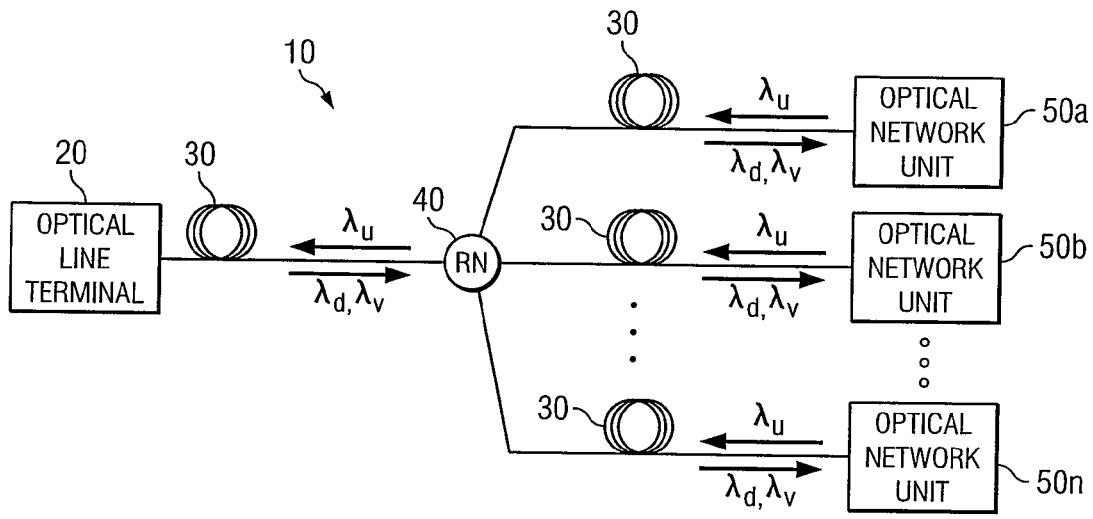
FIG. 1 is a diagram illustrating an example PSPON.

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, broadband PONs (BPONs) are currently being deployed to provide hundreds of megabits per second capacity shared by thirty-two users. Gigabit PONs (GPONs), which typically operate at speeds of up to 2.5 gigabits per second (GB/s) by using more powerful transmitters, provide even greater bandwidth.

Referring back to PSPON 10 of FIG. 1, PSPON 10 includes an Optical Line Terminal (OLT) 20, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 20 (which may be an example of an upstream terminal) may reside at the carrier's central office (where it may be coupled to a larger communication network) and includes a transmitter operable to transmit traffic in a downstream wavelength, such as $\lambda_d$, for broadcast to all ONUs 50, which may reside at or near customer sites. OLT 20 may also include a transmitter operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 20 also includes a receiver operable to receive traffic from all ONUs 50 in a time-shared upstream wavelength, $\lambda_u$. In typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. It should be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda_d$ may include the band centered around 1490 nm, $\lambda_v$ may include the band centered around 1550 nm, and $\lambda_v$ may include the band centered around 1311 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers. RN 40 of PSPON 10 (which may also generally be referred to as a distribution node) comprises any suitable power splitter, such as an optical coupler, and connects OLT 20 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 20.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers. Subscribers may include residential and/or commercial customers. Typically, PONs 10 have thirty-two ONUs 50 per OLT 20, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, the OLT 20 of a typical PSPON 10 transmits downstream traffic destined for one or more of ONUs 50 in $\lambda_d$. OLT 20 may also transmit downstream analog video traffic for broadcast to ONUs 50 in $\lambda_v$. Traffic in wavelengths $\lambda_d$ and $\lambda_v$ is combined at OLT 20 and travels over optical fiber 30 to RN 40. RN 40 splits the downstream traffic into a suitable number of copies and forwards each copy to a corresponding ONU. Each ONU receives a copy of the downstream traffic in $\lambda_d$ and $\lambda_u$ and processes the signal. Suitable addressing schemes may be used to identify which traffic is destined for which ONU 50. Each ONU 50 may also transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal. RN 40 forwards the signal over fiber 30 to OLT 20. OLT 20 receives the signal and processes it.

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater. In the past, network operators have met increased demand by increasing the transmission rate of transmitters, such as, for example, by upgrading from BPONs to GPONs. However, a switch to a wavelength division multiplexing PON (WDMPON), in which each ONU would receive and transmit traffic over a dedicated downstream and upstream wavelength, respectively, would dramatically increase network capacity and satisfy the demand for bandwidth for many years to come.

Figure 2:
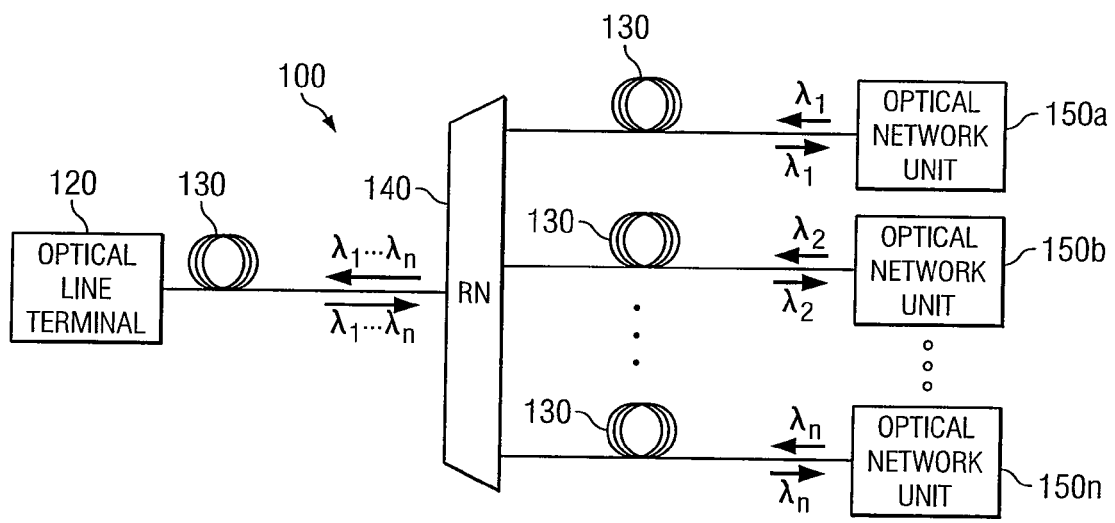
FIG. 2 is a diagram illustrating an example WDMPON.

FIG. 2 is a diagram illustrating an example WDMPON 100. WDMPON 100 may include any suitable WDMPON (also referred to as WPON) or Dense WDMPON (DWDMPON). WDMPON 100 includes OLT 120, optical fiber 130, RN 140, and ONUs 150. Common features of WDMPONs include dedicating at least one upstream and one downstream wavelength for each ONU. Thus, WDMPONs are operable to transmit downstream traffic over multiple, dedicated wavelengths from an OLT, each wavelength corresponding to a particular ONU. In addition, each ONU is operable to transmit upstream traffic over a dedicated wavelength, separate from the wavelengths used by the other ONUs 150. Thus, the upstream and downstream bandwidth of WDMPON 100 is N times greater than the bandwidth of a PSPON, where N equals the number of dedicated wavelengths over which traffic is carried in each direction.

Referring back to FIG. 2, OLT 120 of example WDMPON 100 may reside at the carrier's central office and includes multiple transmitters (equal to the number of ONUs 150), each operable to transmit a dedicated downstream wavelength, one of $\lambda_1$-$\lambda_n$, carrying traffic for a corresponding ONU 150. OLT 120 also includes multiple receivers (equal to the number of ONUs 150), each operable to receive a dedicated upstream wavelength, one of $\lambda_1$-$\lambda_n$, carrying traffic from a corresponding ONU 150. OLT 120 also includes a multiplexer operable to multiplex the downstream wavelengths transmitted by the transmitters of OLT 120 and demultiplex the upstream signal (comprising traffic in multiple wavelengths) that OLT 120 receives from ONUs 150. After demultiplexing the signal, the multiplexer is operable to forward the traffic in each wavelength to a corresponding receiver in OLT 120. It should be noted that $\lambda_1$-$\lambda_n$ in the downstream direction may (or may not) be transmitted at the same wavelengths as $\lambda_1$-$\lambda_n$ traveling upstream (despite having similar designation for simplicity of this discussion).

Optical fiber 130 may include any suitable fiber and is operable to carry upstream and downstream traffic. In certain WDMPONs 100, optical fiber 130 may comprise, for example, bidirectional optical fiber. In other WDMPONs 100, optical fiber 130 may comprise two distinct fibers. RN 140 of WDMPON 100 comprises any suitable multiplexer and connects OLT 120 to ONUs 150. RN 140 is located in any suitable location and has one port to receive a downstream signal comprising multiple wavelengths from OLT 120 and multiple ports (equal to the number of ONUs 150) to forward traffic in each wavelength to a corresponding ONU. RN 140 is operable to demultiplex a downstream signal such that each ONU 150 receives traffic over its dedicated downstream wavelength, one of $\lambda_1$-$\lambda_n$. RN 140 is also operable to multiplex upstream traffic carried over $\lambda_1$-$\lambda_n$ into a single upstream signal, the traffic in each wavelength corresponding to one ONU 150. RN 140 is operable to forward the upstream signal to OLT 120.

ONUs 150 may include any suitable optical network unit or ONT and may serve residential and/or commercial customers. Each ONU 150 comprises one receiver to receive downstream traffic over its dedicated downstream wavelength from OLT 120. Each ONU 150 also comprises one transmitter to transmit upstream traffic over its dedicated upstream wavelength. Each ONU 150 may be capable of transmitting and receiving traffic in any wavelength used in WDMPON 100 such that the wavelengths assigned to the various ONUs may be changed without having to change the transmitting and receiving components in the ONUs. An ONU capable of operating in this fashion is typically referred to as a "colorless" ONU.

In operation, each transmitter in OLT 120 transmits downstream traffic for a corresponding ONU 150 over a dedicated wavelength, a corresponding one of $\lambda_1$-$\lambda_n$. The downstream wavelengths are multiplexed at OLT 150 into one signal, and the signal travels over optical fiber 130 to RN 140. RN 140 receives the signal and demultiplexes the signal into its constituent wavelengths, forwarding the traffic in each wavelength to a corresponding ONU 150. Each ONU 150 receives traffic over the associated wavelength and processes the traffic. Each ONU 150 may also transmit upstream traffic over a dedicated wavelength, one of $\lambda_1$-$\lambda_n$, along fiber 130. RN 140 receives upstream traffic from all of the ONUs 150 carried over these dedicated wavelengths and multiplexes the traffic from all of the ONUs 150 into one signal. RN 140 forwards the signal over fiber 130 to OLT 120. OLT 120 receives the signal and demultiplexes it into its constituent wavelengths. The demultiplexer of OLT 120 forwards the traffic in each wavelength to a corresponding receiver, and OLT 120 processes the traffic.

As is easily observed in the WDMPON 100 of FIG. 2, WDMPONs dramatically increase bandwidth at the access network by multiplying network capacity by the number of wavelengths carried. However, the increase in bandwidth using WDMPONs comes at a significant cost. For example, WDMPONs require highly stable WDM components to distribute narrowly spaced dedicated wavelengths (or channels) from the OLT to each ONU and from each ONU to the OLT. For example, the multiplexer/demultiplexer at RN 140 and the receivers and transmitter at each ONU 150 must all be precisely tuned. In practice, the density of the channels requires wavelength stabilized transmitters and temperature insensitive multiplexers, both of which add significantly to the cost of the network. Many WDMPON components (including colorless ONUs) are also expensive and as-of-now unproven technologies whose reliability has not been determined. Thus, according to some estimates, implementing a WDMPON may cost two to five times as much as a GPON and WDMPON may be unreliable.

In addition to these high costs, replacing current networks with WDMPONs would also inefficiently increase network capacity beyond present needs. In fact, WDMPONs are expected to exceed demand for many years. Thus, many network operators would prefer to make gradual upgrades from existing networks, such that increases in bandwidth (and thus the cost of such increases) correspond more closely with increases in consumer demand. These operators may eventually upgrade to a WDMPON after one or more intermediary upgrades, thereby incurring the cost of WDMPON bandwidth over a greater period of time and according to consumer demand. Thus, a need exists for a hybrid PON (HPON) that offers a simple and efficient upgrade from existing PSPONs and that may easily and efficiently be upgraded (to, for example, a WDMPON).

Figure 3:
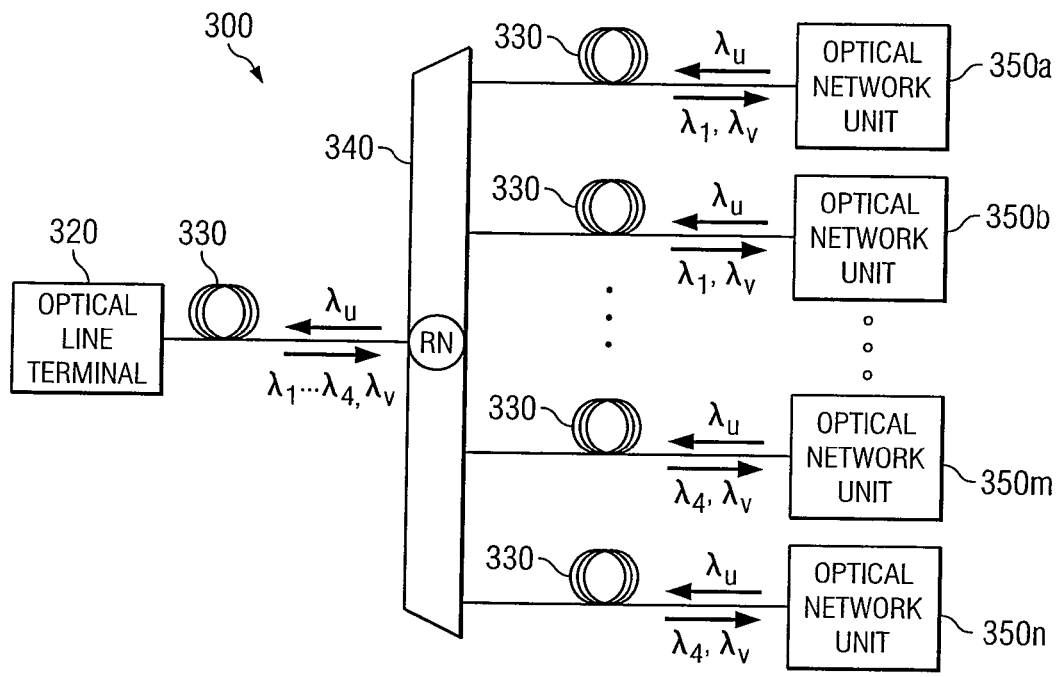
FIG. 3 is a diagram illustrating an example Wavelength Shared Hybrid PON (WS-HPON)

FIG. 3 is a diagram illustrating an example Wavelength Shared Hybrid PON (WS-HPON) 300. Example WS-HPON 300 comprises OLT 320, optical fiber 330, RN 340, and ONUs 350. Example WS-HPON 300, a hybrid between a PSPON and a WDMPON, provides a cost-efficient upgrade solution for many network operators. Example WS-HPON 300 provides greater downstream capacity cost-efficiently by having groups of two or more ONUs 350 share downstream WDM wavelengths, thus reducing the need for densely multiplexed wavelengths and the need for highly stable multiplexers and transceivers. It should be noted that an HPON generally refers to any suitable PON that is not a full WDM-PON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON) and an HPON that transmits downstream traffic in a unique wavelength for each ONU (retaining PSPON characteristics in the upstream direction).

In the illustrated example, ONUs 350a-350n may share $\lambda_1$-$\lambda_4$. Traffic in $\lambda_v$ is broadcast to all ONUs. It should be noted that any suitable number of ONUs may be associated with one OLT. Additionally, any suitable number of ONUs may share one or more wavelengths in a WS-HPON. Using shared wavelengths in WS-HPON permits the use of less costly optics components (such as, for example, low-cost CWDM optics), allowing for an upgrade in capacity at a lower cost than other HPONs or WDMPON.

For example, sharing downstream wavelengths in WS-HPON 300 reduces the cost and stability requirements of the multiplexer and transmitter/receiver components in the network. Due to the sharing of wavelengths, the spacing between WDM wavelengths may be increased to relax the specifications of wavelength selective elements and to relax the requirements for transmitter wavelength stability and temperature stability of passive components. By using less expensive components to provide a desired increase in downstream bandwidth, WS-HPON 300 is a much more attractive upgrade solution for many network operators than are other HPONs. In addition, WS-HPON 300 is also upgradeable to WDMPON, allowing migration to WDMPON if and when there is sufficient demand to justify the cost for the increase in bandwidth.

OLT 320 of WS-HPON 300 (which may be an example of an upstream terminal) may reside at the carrier's central office and comprises four transmitters operable to transmit downstream traffic over $\lambda_1$-$\lambda_4$, which are to be shared by groups of ONUs 350. OLT 320 may also comprise an additional transmitter operable to transmit an analog video signal in $\lambda_v$ for broadcast to all ONUs 350. OLT 320 may also comprise a multiplexer operable to multiplex the wavelengths transmitted by the transmitters of OLT 320. OLT 320 may also comprise a receiver operable to receive upstream traffic in wavelength $\lambda_u$, which is time-shared by ONUs 350. It should be noted that although the illustrated embodiment shows only four downstream wavelengths to be shared by ONUs 350, any suitable number of downstream wavelengths may be transmitted at OLT 320 and shared by groups of ONUs 350. In addition, any suitable number of downstream wavelengths may be transmitted at OLT 320 and the traffic in these wavelengths broadcast to all ONUs 350 (and not just the traffic in $\lambda_v$, as illustrated). It should be further noted that traffic in any suitable number of upstream wavelengths may be received at OLT 320 (including traffic in multiple sub-bands of the GPON one hundred nanometer upstream band, as discussed further below in conjunction with FIG. 6) and an upstream wavelength need not be time-shared by all ONUs (for example, a separate upstream wavelength may be time-shared by each group of downstream, wavelength-sharing ONUs).

Optical fiber 330 may comprise any suitable fiber to carry upstream and downstream traffic. In certain WS-HPONs 300, optical fiber 330 may comprise, for example, bidirectional fiber. In other WS-HPONs 300, optical fiber 330 may comprise two distinct fibers.

RN 340 of WS-HPON 300 may comprise a multiplexer and a power splitter. The multiplexer is operable to demultiplex downstream wavelengths $\lambda_1$-$\lambda_4$ and forward traffic in each of these wavelengths to a corresponding group of wavelength-sharing ONUs 350. The power splitter is operable to receive and split traffic in downstream wavelength $\lambda_v$ (if applicable) for broadcast to all ONUs 350. With regard to upstream traffic, the power splitter of RN 340 is also operable to receive and combine traffic in time-shared $\lambda_u$ from ONUs 350 into one signal. RN 340 is further operable to forward the upstream signal to OLT 320. It should be noted that although RN 340 is referred to as a remote node, "remote" refers to RN 340 being communicatively coupled to OLT 320 and ONUs 350 in any suitable spatial arrangement. A remote node may also generally be referred to as a distribution node.

ONUs 350 (which may be examples of downstream terminals) may comprise any suitable optical network unit or ONT and may serve residential and/or commercial customers. There may be any suitable number of ONUs. Each ONU 350 may comprise one receiver to receive traffic over a shared wavelength, one of $\lambda_1$-$\lambda_4$, and one receiver to receive traffic over $\lambda_v$ (if applicable). Each ONU 350 may also comprise one transmitter to transmit upstream traffic over time-shared $\lambda_u$. Each ONU 350 may thus comprise a triplexer.

In operation, the transmitters in OLT 320 transmit downstream traffic over $\lambda_1$-$\lambda_4$, which are to be shared by groups of ONUs 350, and (in certain cases) one transmitter in OLT 320 transmits downstream traffic to be broadcast to all ONUs 350 over $\lambda_v$. Traffic in wavelengths $\lambda_1$-$\lambda_4$ and $\lambda_v$ is multiplexed at OLT 320 into one signal, and the signal travels over optical fiber 330 to RN 340. RN 340 filters the traffic in $\lambda_v$ out of the signal and forwards the traffic to the power splitter where it is split for broadcast to all ONUs 350. At the multiplexer, RN 340 demultiplexes the signal comprising the traffic in the remaining wavelengths ($\lambda_1$-$\lambda_4$) and forwards the traffic in each wavelength, one of $\lambda_1$-$\lambda_4$, to its corresponding group of wavelength-sharing ONUs 350. Each ONU 350 receives traffic over one or more of the wavelengths that it shares with other ONUs 350 and processes the traffic (according to a suitable protocol). Each ONU 350 may also receive and process traffic over $\lambda_v$. In the upstream direction, each ONU 350 time-shares use of $\lambda_u$ according to a suitable protocol. RN 340 receives upstream traffic carried over time-shared $\lambda_u$ from each of the ONUs 350 and combines the traffic into one signal using the power splitter. RN 340 forwards the combined signal over fiber 230 to OLT 220. OLT 220 receives the signal at its receiver and processes the traffic.

Modifications, additions, or omissions may be made to the WS-HPON 300 described without departing from the scope of the invention. The components of the WS-HPON 300 described may be integrated or separated according to particular needs. Moreover, the operations of the WS-HPON 300 described may be performed by more, fewer, or other components.

Referring back to the discussion of PSPONs, PSPONs may transmit downstream traffic over two wavelengths $\lambda_d$ and $\lambda_v$, and upstream traffic over time-shared wavelength $\lambda_u$. Many typical PSPONs are not easily upgradeable to an HPON. Upgrades of typical PSPONs to HPONs require a disruption in service. For example, in existing PSPONs, fiber cuts are required to add or modify components, disrupting service in existing networks. Thus, a need exists for an easily upgradeable PSPON.

Figure 4:
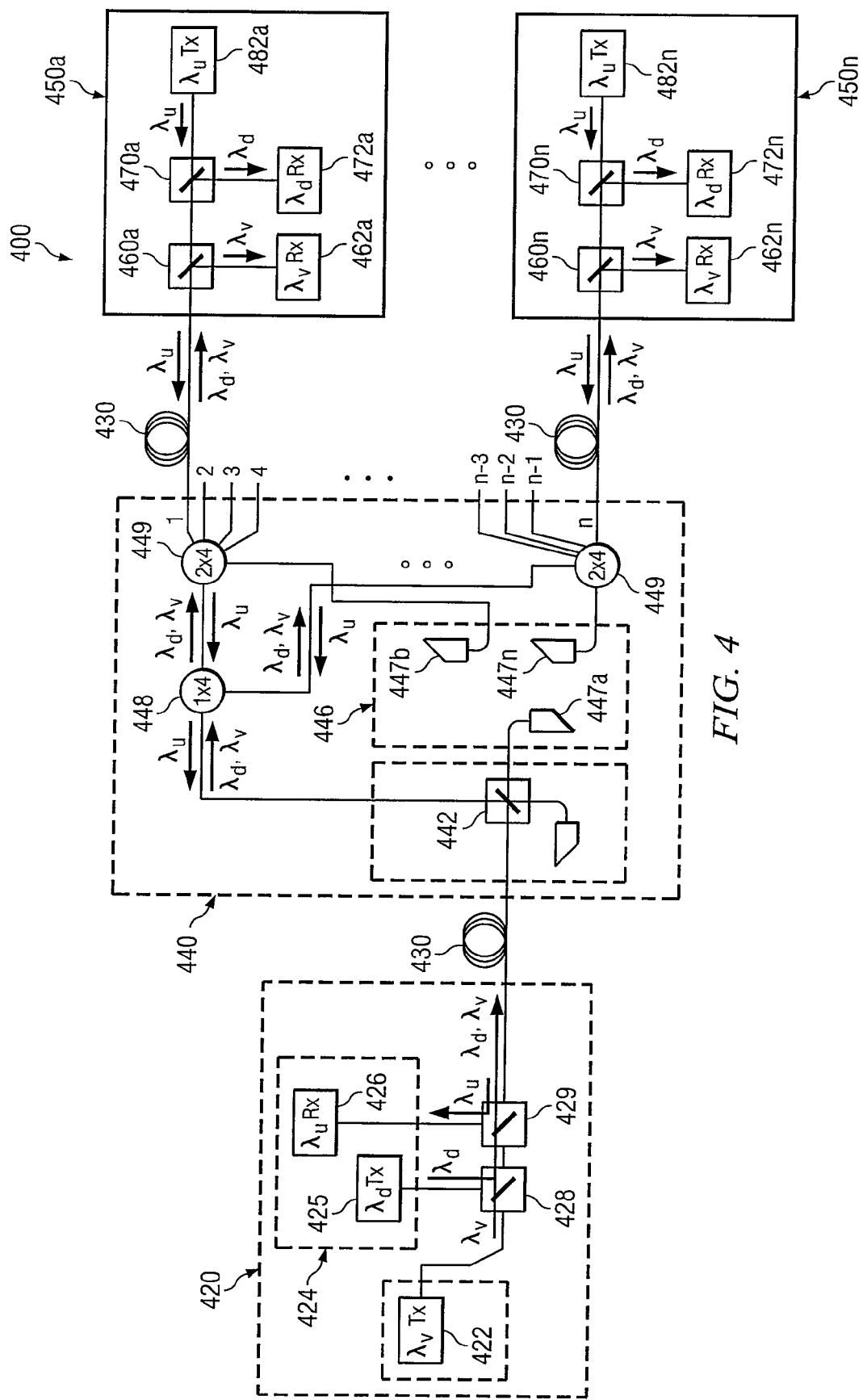
FIG. 4 is a diagram illustrating an example upgradeable PSPON.

FIG. 4 is a diagram illustrating an example upgradeable PSPON 400. Example PSPON 400 comprises OLT 420, optical fiber 430, RN 440, and ONUs 450. The upgradeability of upgradeable PSPON 400 may be provided for any PSPON such as those described above in conjunction with PSPON 10 of FIG. 1

OLT 420 of example upgradeable PSPON 400 (which may be an example of an upstream terminal) comprises a transmitter 422, transceiver 424 comprising transmitter 425 and receiver 426, and filters 428 and 429. Transmitter 422 may comprise any suitable transmitter and is operable to transmit traffic over wavelength $\lambda_v$. Transmitter 422 of typical PSPONs may transmit analog video traffic (although transmitter 422 may alternatively transmit digital data traffic). Transmitter 425 of transceiver 424 may comprise any suitable transmitter operable to transmit traffic over wavelength $\lambda_d$. Transmitter 425 of typical PSPONs may transmit digital data traffic. Transmitters 422 and 425 may transmit at any suitable bit rate. Receiver 426 of transceiver 424 may comprise any suitable receiver operable to receive upstream traffic from ONUs 450 carried over $\lambda_u$. Filter 428 comprises any suitable filter operable to pass the traffic in $\lambda_v$ and direct the traffic in $\lambda_d$ to RN 440. The traffic in $\lambda_d$ and $\lambda_v$ may also be combined into one signal at filter 428. Filter 429 comprises any suitable filter operable to pass the traffic in downstream wavelengths $\lambda_d$ and $\lambda_v$ to RN 440 and direct the traffic in upstream wavelength $\lambda_u$ to receiver 426.

Optical fiber 430 may comprise any suitable fiber to carry upstream and downstream traffic. In particular example upgradeable PSPON 400, optical fiber 430 may comprise bidirectional optical fiber. Alternatively, optical fiber 430 may comprise one fiber for downstream traffic and one fiber for upstream traffic.

RN 440 comprises a filter 442, a lead termination section 446, a primary power splitter 448, and secondary power splitters 449. RN 440 is configured to be easily upgraded to implement a WS-HPON and, eventually, a WDMPON. Filter 442 comprises any suitable filter and may include, for example, a band splitting filter. Filter 442 is operable to direct the traffic in downstream wavelengths that are to be split and broadcast by primary power splitter 448 and pass the traffic in downstream wavelengths that are to be demultiplexed (once the system is upgraded to a WS-HPON). Filter 442 is also operable to direct the traffic in upstream wavelengths to OLT 420. Before an upgrade from a PSPON, filter 442 directs the traffic in $\lambda_d$ and $\lambda_v$ to primary power splitter 448 for broadcast, and directs the traffic in $\lambda_u$ from primary power splitter 448 to OLT 420. Filter 442 may be coupled to a termination point that may terminate the traffic in wavelengths forwarded to it by filter 442 (although the termination point may be internal to filter 442 in alternate example networks). Although the illustrated example includes only one filter 442, example upgradeable PSPONs may comprise any suitable number of filters (and optional switches) to seamlessly upgrade the network.

Lead termination section 446 of RN 440 allows for an easy upgrade of network 400 by inserting a wavelength router such as a multiplexer for performing WDM. Lead termination section 446 comprises a plurality of fiber leads. One input fiber lead 447a is coupled to filter 442, and multiple output fiber leads 447b-447n are coupled to corresponding secondary power splitters 449. Before an upgrade, leads 447a-447n of lead termination section 446 may be configured such that they terminate any signal that they may receive. After an upgrade, leads 447a-447n may be coupled to corresponding multiplexer ports, allowing for easy integration of a multiplexer (to perform WDM) into the network, as described in more detail below in conjunction with FIG. 5. There may be any suitable number of leads in network 400.

Primary power splitter 448 comprises any suitable power splitter, such as an optical coupler, and is operable to split a downstream optical signal into a suitable number of copies and to combine a plurality of upstream optical signals into one signal. In the illustrated example, primary power splitter 448 is operable to broadcast the traffic in $\lambda_d$ and $\lambda_v$ by splitting the downstream signal comprising these wavelengths into four copies (which are then forwarded to secondary power splitters 449 for eventual receipt by all ONUs 450). Primary power splitter 448 is also operable to combine upstream traffic transmitted over $\lambda_u$ by ONUs 450 into one signal. Although primary power splitter 448 is illustrated as a 1×4 power splitter, primary power splitter 448 may comprise any suitable splitter or combination of splitters such that each ONU 450 receives a copy of the traffic in $\lambda_d$ and $\lambda_v$ and such that the upstream signals from ONUs 450 are combined for communication to OLT 420. A wavelength router and a power splitter may each be members of a group referred to as distributors.

Each secondary power splitter 449 comprises any suitable power splitter, such as an optical coupler or combination of couplers, operable to split a downstream signal and combine an upstream signal. In the downstream direction, each secondary power splitter 449 is operable to receive a signal from primary power splitter 448 and distribute the combined signal to a corresponding group of ONUs 450 (in addition, after upgrade to WS-HPON, secondary power splitters 449 serve to combine signals received from primary power splitter 448 and from the multiplexer inserted into lead termination section 446, as described below, and to distribute this combined signal to ONUs 450). Pre-upgrade, secondary power splitters 449 only receive a signal from primary power splitter 448 and do not receive a signal from lead termination section 446. After a multiplexer is added to the network, however, secondary power splitters 449 may receive a signal from primary power splitter 448 and the multiplexer (coupled to lead termination section 446). In the upstream direction, each secondary power splitter 449 is operable to receive and combine traffic over time-shared $\lambda_u$ from a corresponding group of ONUs 450, split the combined traffic into two copies, and distribute one copy to lead termination section 446 and one copy to primary power splitter 448. In the illustrated example, the copy passed to lead termination section 446 is terminated, and the copy passed to primary power splitter 448 is combined with other upstream signals (from the other secondary power splitters 449) and forwarded to filter 442. It should be noted that although secondary power splitters 449 are represented by 2×4 couplers in the illustrated example, any suitable coupler (or combination of couplers) may be used.

Each ONU 450 (which may be an example of a downstream terminal) may comprise any suitable ONU or ONT. In the illustrated example network, ONU 450 comprises a filter 460, a receiver 462, a filter 470, a receiver 472, and a transmitter 482. Since each ONU 450 in the illustrated example comprises two receivers and one transmitter, it may be referred to as a triplexer. However, any suitable number of transmitters and/or receivers may reside at each ONU. Each filter 460 may comprise any suitable filter operable to direct traffic in $\lambda_v$ to a corresponding receiver 462 and to pass traffic in $\lambda_d$ in the downstream direction and $\lambda_u$ in the upstream direction. Each receiver 462 may include any suitable receiver operable to receive traffic in $\lambda_v$ from a corresponding filter 460 and process the traffic. Each filter 470 may comprise any suitable filter operable to direct the traffic in $\lambda_d$ to a corresponding receiver 472 and to pass the traffic in $\lambda_u$ in the upstream direction. Each receiver 472 may include any suitable receiver operable to receive the traffic in $\lambda_d$ from a corresponding filter 470 and process the traffic. Each transmitter 482 may comprise any suitable transmitter operable to transmit the traffic in $\lambda_u$ upstream. ONUs 450 may time-share $\lambda_u$ using a suitable communication protocol to avoid collision of upstream traffic. It should be noted that any suitable number of ONUs 450 may be implemented in PSPON 400.

In operation, in the downstream direction, transmitter 422 of OLT 420 may transmit downstream traffic (for example, analog video) over $\lambda_v$, and transmitter 425 may transmit downstream traffic (for example, digital data) over $\lambda_d$. Filter 428 receives the two signals and passes the traffic in $\lambda_v$ and directs the traffic in $\lambda_d$ (thereby combining the traffic into one signal) to filter 429. Filter 429 receives the combined signal comprising the traffic in $\lambda_v$ and $\lambda_d$ and allows the signal to pass over fiber 430 to filter 442 of RN 440. Filter 442 receives the signal comprising the traffic in $\lambda_d$ and $\lambda_v$ and directs the traffic in both wavelengths to primary power splitter 448. Primary power splitter 448 receives the signal comprising the traffic in $\lambda_d$ and $\lambda_v$, splits the traffic into multiple copies (in this example, four copies), and forwards each copy to a corresponding secondary power splitter 449. Each secondary power splitter 449 receives a copy of the signal comprising the traffic in $\lambda_d$ and $\lambda_v$, splits the copy into multiple additional copies (in this example, four additional copies of each copy), and passes each additional copy over fiber 430 to a corresponding ONU 450. Each ONU 450 receives a copy of the signal comprising the traffic in $\lambda_d$ and $\lambda_v$ at a corresponding filter 460. Each filter 460 passes the traffic in $\lambda_d$ to filter 470 and directs the traffic in $\lambda_v$ to receiver 462. Filter 470 receives the traffic in $\lambda_d$ and directs it to receiver 472. Receivers 462 and 472 receive and process the traffic in $\lambda_v$ and $\lambda_d$, respectively.

In the upstream direction, transmitter 482 of each ONU 450 transmits traffic over time-shared $\lambda_u$. The traffic in $\lambda_u$ passes through filters 470 and 460 and over fiber 430 to RN 440. RN 440 receives the traffic in $\lambda_u$ from each ONU 450 at a corresponding secondary power splitter 449. Each secondary power splitter 449 splits the signal into two copies, and forwards one copy to lead termination section 446 and the other copy to primary power splitter 448. Lead termination section 446 receives a copy of the traffic in $\lambda_u$ from each secondary power splitter 449 and terminates the traffic. Primary power splitter 448 receives a copy of the upstream signal from each secondary power splitter 449, combines the signals into one signal, and forwards the combined signal to filter 442. Filter 442 receives the signal comprising the traffic in $\lambda_u$, and directs the signal to OLT 420. The signal travels over fiber 430 to filter 429 of OLT 420. Filter 429 directs the traffic in $\lambda_u$ to receiver 426. Receiver 426 receives the traffic in $\lambda_u$ and processes it.

Therefore, PSPON 400 operates similarly to PSPON 10 (in that both broadcast downstream signals and time-share an upstream signal). However, unlike PSPON 10, PSPON 400 allows for an easy upgrade to a WS-HPON. The optical fiber connecting OLT 420 and ONTs 450 need not be cut to perform this upgrade (thereby avoiding network downtime and the risk of contamination of connectors), and the upgrade to a multiplexer at RN 440 and to multiple transmitters and a multiplexer at OLT 420 may be performed almost completely in-service.

Modifications, additions, or omissions may be made to the PSPON 400 described without departing from the scope of the invention. The components of the PSPON 400 described may be integrated or separated according to particular needs. Moreover, the operations of the PSPON 400 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 5:
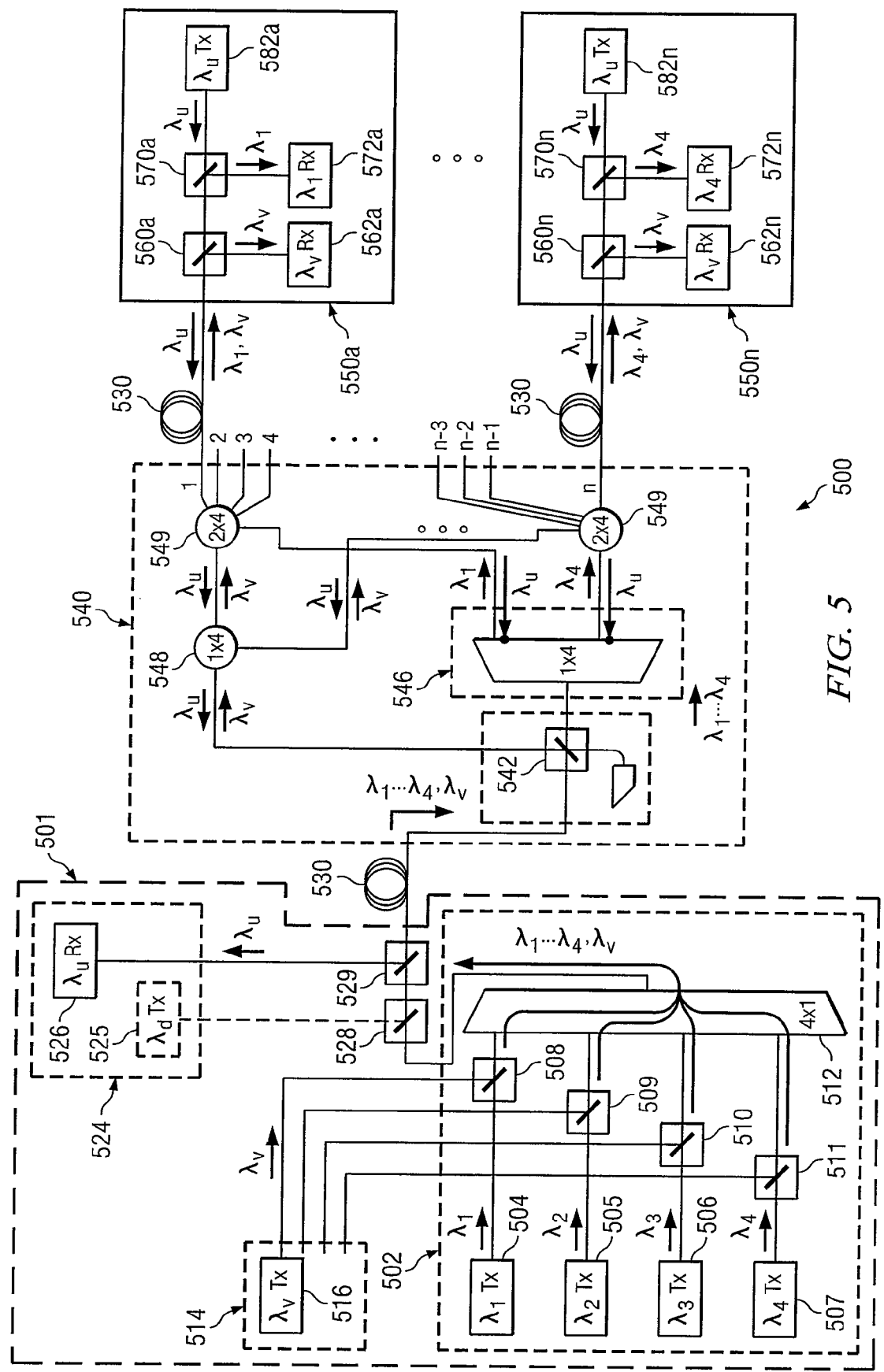
FIG. 5 is a diagram illustrating in more detail the example WS-HPON of FIG. 3.

FIG. 5 is a diagram illustrating in more detail the example WS-HPON of FIG. 3. The example WS-HPON 500 of FIG. 5 also illustrates an upgrade from upgradeable PSPON 400 of FIG. 4. As described above, WS-HPONs may be more attractive upgrade options than many other HPONs or WDMPONs. By sharing downstream WDM wavelengths, WS-HPONs provide an increase in bandwidth over PSPONs at a much lower price than many other HPONs or WDMPONs.

WS-HPON 500 comprises OLT 501, fiber 530, RN 540, and ONUs 550. OLT 501 (which may be an example of an upstream terminal) comprises WDM transmission section 502, upgradeable transmission section 514, PSPON transceiver 524, and filters 528 and 529. WDM transmission section 502 comprises transmitters 504-507, filters 508-511, and multiplexer 512. Each transmitter 504-507 may comprise any suitable transmitter and is operable to transmit traffic over a corresponding wavelength, $\lambda_1$-$\lambda_4$, respectively. It should be noted that although example WS-HPON 500 does not provide WDM for upstream traffic, and thus new receivers are not needed in conjunction with new transmitters 504-507, it may be economical to implement transceivers (transmitter and receiver) in WDM transmission section 502 instead of only transmitters (in anticipation of a further upgrade to WDM upstream). The cost of transceivers is typically less than the cost of a separate transmitter and receiver, thus reducing the eventual overall cost to upgrade to a WDMPON. It should further be noted that although only four new transmitters are illustrated in example WS-HPON 500, any suitable number of transmitters (or transceivers) may be included.

Each filter 508-511 may comprise any suitable filter and is operable to pass the traffic in $\lambda_1$-$\lambda_4$, respectively. In addition, filter 508 is operable to direct the traffic in wavelength $\lambda_v$ from transmitter 516 of upgradeable transmission section 514 to multiplexer 512 (such that the traffic in both $\lambda_1$ and $\lambda_v$ is forwarded to multiplexer 512 over the same fiber). In fact, each filter 508-511 may be coupled to upgradeable transmission section 514 (through a corresponding fiber), allowing for an easy upgrade if more transmitters are added to WS-HPON 500. The fibers coupling filters 509-511 and upgradeable transmission section 514 do not carry a signal in the illustrated example WS-HPON 500 of FIG. 5, as no new transmitters have been added to upgradeable transmission section 514. However, filters 509-511 may be operable to direct the traffic in the corresponding wavelengths associated with potential transmitters added to upgradeable transmission section 514. After the upgrade, filters 509-511 would direct the traffic in the corresponding wavelength from upgradeable transmission section 514 in a similar manner as filter 508 directs the traffic in $\lambda_v$.

Upgradeable transmission section 514 comprises transmitter 516 and a set of three terminating fiber leads. Transmitter 516 comprises any suitable transmitter and is operable to transmit traffic over $\lambda_v$. Transmitter 516 may be the same as transmitter 422 of network 400, and thus $\lambda_v$ of WS-HPON 500 may be the same as $\lambda_v$ of network 400. Transmitter 516 may transmit analog video traffic over $\lambda_v$. The three terminating fiber leads may be coupled to new transmitters if new transmitters are added to upgrade example WS-HPON 500. As discussed above, each terminating lead is coupled to a corresponding filter, one of filters 509-511. It should be noted that although only three fiber leads are illustrated, any suitable number of leads may be added in anticipation of further upgrades of WS-HPON 500.

Multiplexer 512 comprises any suitable multiplexer/demultiplexer (and may be considered a wavelength router) and is operable to combine the traffic in $\lambda_1$-$\lambda_4$ and $\lambda_v$ into one signal. In the illustrated example 500, multiplexer 512 comprises a cyclic multiplexer operable to receive and combine the traffic in more than one wavelength through each port (such as the traffic in $\lambda_1$ and $\lambda_v$ through the first port). In other example networks, multiplexer 512 may be a typical N×1 multiplexer operable to receive only the traffic in one wavelength through each port. Where the traffic in a large number of wavelengths is being multiplexed, a cyclic multiplexer may prove more cost-efficient than a multiplexer having N ports. Furthermore, a cyclic multiplexer may not need to be replaced to add more ports (as with typical multiplexers) if more transmitters are added to the OLT to upgrade WS-HPON 500. For example, WS-HPON 500 may be upgraded to transmit traffic in eight downstream wavelengths, including $\lambda_1$-$\lambda_4$ and additional wavelengths $\lambda_5$-$\lambda_8$. In such an upgrade, cyclic multiplexer 512 need not be replaced to receive the traffic in the four additional wavelengths, as the multiplexer's first port may receive the traffic in $\lambda_1$ and $\lambda_5$, the second port may receive the traffic in $\lambda_2$ and $\lambda_6$, the third port may receive the traffic in $\lambda_3$ and $\lambda_7$, and the fourth port may receive the traffic in $\lambda_4$ and $\lambda_8$. In the contrasting situation in which non-cyclic multiplexers are used, a 4×1 multiplexer would need to be replaced by an 8×1 multiplexer to receive the traffic in the four additional wavelengths.

PSPON transceiver 524 comprises transmitter 525 and receiver 526. Transmitter 525 may be the same transmitter as transmitter 425 of FIG. 4. However, in WS-HPON 500 of FIG. 5, transmitter 525 may no longer transmit traffic over the network, and may be replaced by transmitters 504-507 of WDM transmission section 502. Transmitter 525 may, in particular embodiments, remain in place to provide limited protection for failure of the downstream WDM transmitters or to keep the network operational at lower bandwidth during particular upgrades of the network (such as, for example, an upgrade of the multiplexer in the RN). Receiver 526 of transceiver 524 may comprise any suitable receiver (and may be the same as receiver 426 of network 400) and is operable to receive upstream traffic carried over time-shared $\lambda_u$.

Filter 528 comprises any suitable filter operable to pass the traffic in $\lambda_1$-$\lambda_4$ and $\lambda_v$ to filter 529. Filter 528 may also be operable to pass the traffic in additional wavelengths to be transmitted in upgrades of WS-HPON 500. Although illustrated in-line in WS-HPON 500, in other example embodiments, filter 528 may be switched out of the line using a suitable switch.

Filter 529 comprises any suitable filter operable to pass the traffic in $\lambda_1$-$\lambda_4$ and $\lambda_v$ over fiber 530 to RN 540. Filter 528 may also be operable to pass traffic in additional wavelengths to be transmitted in upgrades of WS-HPON 500. In addition, filter 529 is operable to direct traffic in upstream wavelength $\lambda_u$ to receiver 526.

Optical fiber 530 may comprise any suitable fiber to carry upstream and downstream traffic. In certain WS-HPONs 500, optical fiber 530 may comprise, for example, bidirectional optical fiber. In other WS-HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 501, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 501. To reiterate, WS-HPON 500 is operable to allow wavelength-sharing among groups of ONUs 550, thereby increasing network capacity while avoiding the costly components of a full downstream WDM network such as that in other HPONs or WDM-PON.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network. In the upstream direction, filter 542 is operable to receive the traffic in $\lambda_u$ and direct it toward OLT 501.

Multiplexer 546 may include any suitable multiplexer/demultiplexer (and may be considered a wavelength router) and is operable to receive the signal comprising the traffic in $\lambda_1$-$\lambda_4$ and demultiplex the signal. Although in the illustrated example, multiplexer 546 is a 1×4 multiplexer, in alternative networks, multiplexer 546 may have any suitable number of ports. Also, in alternative networks, multiplexer 546 may comprise two or more separate multiplexers receiving downstream signals from one or more upstream sources and forwarding the traffic downstream such that ONUs share wavelengths. In the illustrated example network, multiplexer 546 may comprise a cyclic multiplexer (in which each port is operable to carry traffic in more than one wavelength). In the downstream direction, each output port of multiplexer 546 is operable to forward the traffic in a corresponding one of $\lambda_1$-$\lambda_4$ to a corresponding secondary power splitter 549. In alternative embodiments, the traffic in each wavelength may pass to a different secondary power splitter than that illustrated, the traffic in more than one wavelength may pass to a secondary power splitter, and/or multiplexer 546 may receive, multiplex, and pass traffic in more than four downstream wavelengths. It should be noted that to upgrade PSPON 400 to WS-HPON 500, multiplexer 546 may be added to the lead termination section 446 of upgradeable PSPON network 400 (with input lead 447a coupled to the multiplexer's input port and output leads 447b-447n coupled to the multiplexer's output ports).

In the upstream direction, multiplexer 546 may be operable to receive and terminate the traffic in $\lambda_u$, as ONUs 550 of example WS-HPON 500 time-share B (and do not transmit traffic over multiple upstream wavelengths). Alternatively, multiplexer 546 may forward this traffic to filter 542 for suitable termination (where termination may be performed internally or externally). However, if WS-HPON 500 is upgraded to provide WDM upstream, multiplexer 546 may be operable to receive traffic in multiple upstream wavelengths from ONUs 550 and multiplex the traffic in these wavelengths, forwarding them to OLT 501.

Primary power splitter 548 may comprise any suitable power splitter and may be primary power splitter 448 of network 400. In the illustrated example WS-HPON, primary power splitter 548 is operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 501. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example WS-HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT and may be the same as ONU 450 of FIG. 4. ONU 550 of FIG. 5 comprises a filter 560, receiver 562, filter 570, receiver 572, and transmitter 582. Each filter 560 may comprise any suitable filter and may be the same as filter 460 of network 400. Each filter 560 is operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver and may be the same as receiver 462 of network 400. Receiver 562 is operable to receive the traffic transmitted in $\lambda_v$ and process the traffic. Each filter 570 may comprise any suitable filter and may be the same as filter 470 of network 400. Each filter 570 is operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver and may be the same as receiver 472 of network 400. Receiver 572 is operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter and may be the same as transmitter 482 of network 400. Transmitter 582 is operable to transmit traffic over $\lambda_u$ in the upstream direction, applying a suitable protocol to time-share $\lambda_u$ with the other ONUs 550. It should be noted that although four ONUs are illustrated as being part of a group of ONUs in WS-HPON 500, any suitable number of ONUs may be part of a group sharing a downstream wavelength. In addition, there may be multiple groups each sharing a different downstream wavelength (as is the case in the illustrated example). It should also be noted that any suitable number of ONUs 550 may be implemented in the network. It should further be noted that, as discussed further below in conjunction with FIG. 6, ONUs 550 may be adjusted in an alternative upgrade to transmit traffic over multiple wavelengths (which may be combined by PS 548 of RN 540) to be received by receivers corresponding to transmitters 504-507 (in which case filter 529 may or may not be taken out of the line). In an alternative upgrade, each group of ONUs sharing a wavelength may transmit upstream traffic in a separate wavelength (and multiplexer 546 may multiplex these wavelengths at the RN, and receivers 504-507 may receive these wavelengths).

In operation, transmitters 504-507 and (analog video) transmitter 516 of OLT 501 may transmit traffic over $\lambda_1$-$\lambda_4$ and $\lambda_v$, respectively. Filters 508-511 receive the traffic in $\lambda_1$-$\lambda_4$, respectively, and pass the signals. Filter 508 also receives and directs the traffic in $\lambda_v$, combining it with the traffic in $\lambda_1$. As discussed above, WS-HPON 500 is configured to be easily upgraded to include additional transmitters at upgradeable transmission section 514 of OLT 501. After receiving the traffic in their corresponding wavelengths, filters 508-511 forward the corresponding signals to multiplexer 512. Multiplexer 512, which may include, for example, a cyclic multiplexer, combines the traffic in the five wavelengths into one signal and forwards the signal to filter 528. As discussed above, filter 528 may be in-line or may be switched out of the line, in which case the downstream signal would pass directly to filter 529. If filter 528 remains in-line, filter 528 receives the downstream signal and allows the signal to pass to filter 529. Filter 529 receives the signal and allows the signal to pass, forwarding the signal over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$. Each secondary power splitter 549 thus receives traffic in a corresponding one of $\lambda_1$-$\lambda_4$ from multiplexer 546 and a copy of traffic in $\lambda_v$ from primary power splitter 548, combines the two wavelengths into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. It should be noted again that the groups of ONUs sharing a wavelength may be different than those illustrated in FIG. 5, and groups of wavelength-sharing ONUs may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (i.e., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 501. Fiber 530 carries the traffic in $\lambda_u$ to filter 529 of OLT 501. Filter 529 receives the traffic in $\lambda_u$ and directs the traffic toward receiver 526. Receiver 526 receives the traffic and processes it.

Modifications, additions, or omissions may be made to the example WS-HPON 500 described without departing from the scope of the invention. The components of the example WS-HPON 500 described may be integrated or separated according to particular needs. Moreover, the operations of the example WS-HPON 500 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 6:
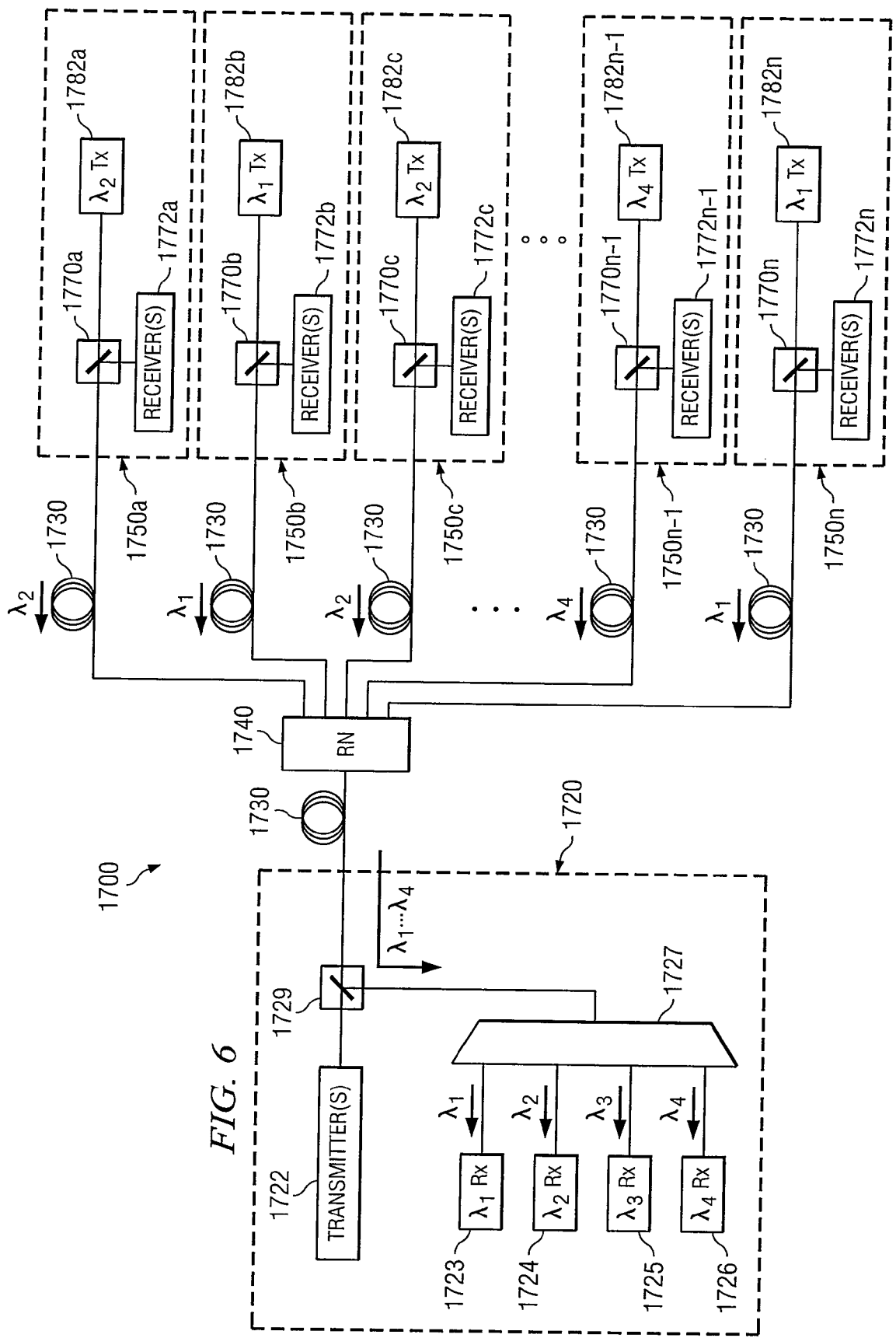
FIG. 6 is a diagram illustrating an example upgraded network having increased upstream transmission capacity.

FIG. 6 is a diagram illustrating an example upgraded network 1700 having increased upstream transmission capacity. Example upgraded network 1700 comprises OLT 1720, fiber 1730, RN 1740, and a plurality of ONUs 1750. Network 1700 may comprise an upgrade to any suitable PON, including a PSPON or an HPON, to increase upstream capacity. For example, upgraded network 1700 may represent an upgrade to PSPON 400 of FIG. 4 or to WS-HPON 500 of FIG. 5, described above.

Network 1700 may increase upstream capacity by upgrading some or all ONUs to ONUs 1750. As discussed above, ONUs of typical PSPONs and HPONs transmit upstream traffic at a single wavelength, $\lambda_u$. In contrast, ONUs 1750 may transmit upstream traffic at a plurality of wavelengths, as discussed further below. Traffic in these wavelengths may be combined by a power splitter in remote node 1740 (without multiplexing the traffic in the plurality of wavelengths), allowing the ONUs to be placed in any suitable location in the network. The power splitter may then forward the combined signal to OLT 1720. The upgrade may include the addition of a demultiplexer 1727 and receivers 1723-1726 at OLT 1720 to receive and process the traffic in the plurality of wavelengths. One of these receivers may include the sole $\lambda_u$ receiver of typical PON OLTs (if, for example, demultiplexer 1727 is already installed); in alternative embodiments, the sole $\lambda_u$ receiver may be replaced by demultiplexer 1727 and receivers 1723-1726. It should be noted that network 1700 need not affect downstream transmission in PSPONs or HPONs in particular embodiments. In addition, network 1700 may be asymmetric, where only the upstream upgrade in bandwidth is provided, or symmetric as part of a larger upgrade of upstream and downstream capacity.

OLT 1720 includes transmitter(s) 1722, receivers 1726, and filter 1729. Like the OLTs discussed above in conjunction with PSPONs and HPONs, OLT 1720 may be an example of an upstream terminal, may reside at a carrier's central office, and may be coupled to a larger communication network at the central office. Transmitter(s) 1722 represent one or more transmitters operable to transmit downstream traffic. In a PSPON, transmitter(s) 1722 may include any suitable PSPON transmitters such as, for example, the transmitters described above in conjunction FIGS. 1 and 4. In an HPON, transmitter(s) 1722 may include any suitable HPON transmitters such as, for example, the transmitters described above in conjunction with FIGS. 3 and 5. Depending on the PON and as described above, transmitter(s) 1722 may transmit at broadcast wavelengths, dedicated wavelengths, and/or shared wavelengths.

Receivers 1723-1726 may comprise any suitable receivers, each operable to receive upstream traffic in a particular wavelength and to process the traffic. In the illustrated embodiment, receivers 1723-1726 receive and process traffic in $\lambda_1$-$\lambda_4$, respectively. However, there may be any suitable number of upstream wavelengths used, and a suitable number of corresponding receivers at OLT 1720 to receive traffic in those wavelengths. It should be noted that $\lambda_1$-$\lambda_4$ in the upstream direction may or may not be the same as $\lambda_1$-$\lambda_4$ in the downstream direction (described above in conjunction with FIG. 5).

In particular embodiments, upstream traffic may be transmitted by ONUs 1750 at sub-bands of the band reserved in the GPON standard for upstream traffic, and receivers 1723-1726 may receive traffic in those sub-bands. According to the "GPON" ITU-T G.984 standard, a one hundred nanometer band is allocated for upstream traffic transmission. Technological advances in transmitters and receivers have resulted in the ability to transmit at much narrower bands than one hundred nanometers (nm). Thus, in typical GPONs, upstream traffic is transmitted at the wavelength sub-band centered around 1310 nm, between approximately 1300 nm and 1320 nm (which may be an example of $\lambda_u$). To increase upstream capacity, traffic may be transmitted at additional sub-bands, such as, for example, the 1271 nm band, the 1291 nm band, the 1331 nm band, and optionally the 1351 nm band. Alternatively, traffic may be transmitted in any other suitable band (including non-standard bands) of any suitable width. For example, in particular embodiments, non-standard bands could be used which could be non-uniformly spaced and of varying bandwidths. In addition, larger bands could be used for near-future upgrades and narrower bands could be used for the longer term.

It should be noted that although, in the illustrated embodiment, upstream traffic is transmitted at four wavelengths, $\lambda_1$-$\lambda_4$, any suitable number of wavelengths (including sub-bands of the GPON one hundred nanometer upstream band) may be used. For example, upstream traffic may be transmitted at five sub-bands of the one hundred nanometer band. Alternatively, wavelengths outside of the GPON one hundred nanometer band may be used. In addition, traffic in each wavelength may be transmitted by one or more ONUs 1750, and one ONU 1750 may transmit traffic in multiple wavelengths, as described further below.

As discussed above, in particular embodiments, receivers 1723-1726 may replace the $\lambda_u$ receiver in the OLT of the PSPON, HPON, or other PON being upgraded. Receivers 1723-1726 may replace, for example, the receivers in the OLTs described above in conjunction with FIGS. 1, 3, 4, and 5. Alternatively, one of receivers 1723-1726 may include the $\lambda_u$ receiver. It should further be noted that, in particular embodiments, receivers 1723-1726 may be part of transceivers, and the corresponding transmitters may transmit, for example, WDM traffic downstream in an HPON.

Demultiplexer 1727 may comprise any suitable demultiplexer operable to receive upstream traffic in a plurality of wavelengths, demultiplex the constituent wavelengths, and forward traffic in each wavelength to a corresponding receiver. In the illustrated embodiment, demultiplexer 1727 receives upstream traffic in $\lambda_1$-$\lambda_4$ from ONUs, demultiplexes the traffic into the four constituent wavelengths, and forwards the traffic in each wavelength to the appropriate receiver. As is illustrated, demultiplexer 1727 may comprise a typical 1×N demultiplexer operable to forward only the traffic in one wavelength through each output port. In alternative embodiments, dumultiplexer 1727 may comprise a cyclic demultiplexer.

Filter 1729 may comprise any suitable filter operable to direct upstream traffic in $\lambda_1$-$\lambda_4$ from ONUs 1750 to multiplexer 1727 and to direct downstream traffic (not illustrated) from transmitter(s) 1722 to RN 1740. Optical fiber 1730 may comprise any suitable fiber to carry upstream and downstream traffic. In particular embodiments, optical fiber 1730 may comprise, for example, bidirectional optical fiber. In alternative embodiments, optical fiber 1730 may comprise two distinct fibers, one fiber carrying downstream traffic and the other fiber carrying upstream traffic.

RN 1740 may comprise any suitable remote node in a PSPON, HPON, or other PON. In an upstream upgrade to a PSPON or an HPON, the RN of the PSPON or HPON being upgraded need not be modified. Routing with regard to downstream traffic may, for example, not change. Routing with regard to upstream traffic may change, for example, only with regard to the number and type of wavelengths being received and combined at the RN's primary power splitter (i.e., multiple sub-bands of the GPON one hundred nanometer band instead of one $\lambda_u$ sub-band).

With regard to downstream traffic in an example PSPON upgraded to become network 1700, RN 1740 may be operable to split the traffic at a primary power splitter. The primary power splitter may be operable to split the traffic into a suitable number of copies and forward the copies for distribution to ONUs 1750. With regard to upstream traffic, RN 1740 may be operable to receive the traffic in a plurality of wavelengths (i.e., sub-bands of the GPON one hundred nanometer band), combine the traffic in the wavelengths at the primary power splitter, and forward the combined traffic to OLT 1720. As can be observed, no modifications of the RN may be needed in a PSPON upgrade.

To further illustrate, in an upstream upgrade of PSPON 400 described above in conjunction with FIG. 4, downstream operation of RN 440 may not change. Primary power splitter 448 may be operable to receive downstream traffic in $\lambda_d$ and $\lambda_v$, split the traffic into a suitable number of copies, and forward the copies to secondary power splitters 449 for distribution to ONUs 450. In the upstream direction, operation of RN 440 may also not change. However, instead of receiving traffic in $\lambda_u$ from ONUs 450, RN 440 may be operable to receive traffic in a plurality of wavelengths such as, for example, sub-bands of the GPON one hundred nanometer upstream band, from ONUs 450, combine the traffic in these wavelengths at secondary power splitters 449 and primary power splitter 448 (terminating copies forwarded to termination leads 447), and forward the combined signal to OLT 420. It should be noted that, although network 1700 has been described in conjunction with a particular example PSPON, any suitable RN in any suitable PSPON may be operable to receive upstream traffic in plurality of wavelengths from ONUs in the PSPON, combine the traffic at a primary power splitter, and forward the traffic to an OLT.

In an example HPON upgraded to become network 1700, RN 1740 may be operable to, in the downstream direction, direct traffic in wavelengths to be forwarded to all ONUs 1750 to a primary power splitter (if any such traffic exists) and direct traffic in wavelengths to be forwarded only to particular ONUs 1750 to a wavelength router. The primary power splitter may be operable to split received traffic into a suitable number of copies and forward the copies for distribution to ONUs 1750. The wavelength router may be operable to separate traffic in particular wavelengths and forward the traffic in particular wavelengths to particular ONUs 1750. In the upstream direction, RN 1740 may be operable to receive upstream traffic in a plurality of wavelengths from ONUs 1750, combine the traffic in the plurality of wavelengths at the primary power splitter, and forward the combined traffic to OLT 1720. As can be observed, no modifications of the RN may be needed in an HPON upgrade.

To further illustrate, in an upstream upgrade to WS-HPON 500 described above in conjunction with FIG. 5, downstream operation of RN 540 may not change. Primary power splitter 548 may be operable to receive downstream traffic in $\lambda_v$, split the traffic into a suitable number of copies, and forward the copies to secondary power splitters 549 for distribution to ONUs 550. Multiplexer 546 may be operable to receive downstream WDM traffic in $\lambda_1$-$\lambda_4$ and demultiplex the WDM traffic. Multiplexer 546 may be further operable to forward traffic in $\lambda_1$ to a first set of wavelength-sharing ONUs 550, traffic in $\lambda_2$ to a second set of wavelength-sharing ONUs 550, traffic in $\lambda_3$ to a third set of wavelength-sharing ONUs 550, and traffic in $\lambda_4$ to a fourth set of wavelength-sharing ONUs 550.

In the upstream direction, operation may also not change at RN 540. However, instead of receiving traffic in $\lambda_u$ from ONUs 550, RN 540 may receive traffic in a plurality of wavelengths from ONUs 550, designated in FIG. 6 as $\lambda_1$-$\lambda_4$. As in the upgrade to the PSPON described above, these wavelengths may be sub-bands of the GPON one hundred nanometer upstream band in particular embodiments. RN 540 may be operable to combine the traffic in the plurality of wavelengths at secondary power splitters 549 and primary power splitter 548 (terminating copies forwarded to multiplexer 546), and forward the combined signal to OLT 520. It should be noted again that, in particular embodiments, wavelengths $\lambda_1$-$\lambda_4$ in the upstream direction may not be the same as wavelengths $\lambda_1$-$\lambda_4$ in the downstream direction (and are designated the same only for simplicity in explication); in alternative embodiments, $\lambda_1$-$\lambda_4$ in the upstream direction may be the same as wavelengths $\lambda_1$-$\lambda_4$ in the downstream direction. It should further be noted that, although a particular HPON has been described, any suitable RN in any suitable HPON may be operable to receive upstream traffic in a plurality of wavelengths from ONUs, combine the traffic at a primary power splitter, and forward the traffic to an OLT.

Referring again to FIG. 6, each ONU 1750 may comprise any suitable device operable to receive and process downstream traffic from OLT 1720 and transmit upstream traffic to OLT 1720. Each ONU 1750 comprises a filter 1770, receiver(s) 1772, and a transmitter 1782. Each filter 1770 may comprise any suitable filter operable to direct downstream traffic to receiver(s) 1772 and direct upstream traffic from transmitter 1782 to RN 1740. In particular embodiments, filter 1770 may represent any suitable number of filters.

Each receiver(s) 1772 is operable to receive downstream traffic from an associated filter 1770 and process the traffic in any suitable manner. In a PSPON, receiver 1772 may comprise, for example, any of the receivers in an ONU described above in conjunction with FIGS. 1 and 5. In an HPON, receiver 1772 may comprise, for example, any of the receivers in an ONU described above in conjunction with FIGS. 3, 4, 6, and 7.

In particular embodiments, each transmitter 1782 may comprise any suitable transmitter operable to transmit upstream traffic at a particular wavelength. For example, in the illustrated embodiment, transmitter 1782a may transmit at $\lambda_2$, transmitter 1782b may transmit at $\lambda_1$, transmitter 1782c may transmit at $\lambda_2$, and transmitter 1782n may transmit at $\lambda_4$. In particular embodiments, each transmitter may transmit at a particular sub-band of the GPON one hundred nanometer band (although any other suitable wavelengths may be used). In particular GPON or HGPON embodiments, one or more transmitters 1782 may transmit at 1271 nm, 1291 nm, 1311 nm, 1331 nm, and/or 1351 nm. One or more transmitters 1782 may transmit at a fixed wavelength and/or may be tunable to transmit at a particular wavelength.

It should be noted that multiple ONUs 1750 may share a wavelength for upstream transmission. Although the illustrated embodiment shows only two ONUs sharing $\lambda_1$ and two ONUs sharing $\lambda_2$, two or more ONUs may share any one of $\lambda_1$-$\lambda_4$ (although one or more of $\lambda_1$-$\lambda_4$ may not be shared in particular embodiments). If more than one ONU 1750 shares transmission of upstream traffic in a particular wavelength (i.e., transmitters 1782a and 1782c), such ONUs 1750 may suitably time-share transmission at the wavelength using any suitable communication protocol to avoid collision of upstream traffic (for example as described in the GPON ITU-T G.984 standard). It should further be noted that each ONU 1750 may be placed in any suitable location in the network (and not necessarily as illustrated in FIG. 6).

Because upstream traffic may be combined at the primary power splitter in RN 1740 (instead of at a multiplexer in the RN), ONUs 1750 in either PSPONs or HPONs need not be "colorless" nor need they be placed in specific locations in the network (as in WDMPON, for example). Due to the use of a coupler at RN 1740, any wavelength transmitted by an ONU 1750 at the end of any branch of fiber in the PON will be received at filter 1729 of OLT 1720 regardless of the branch coupling the ONU 1729 to the RN 1740. Thus, in particular embodiments, ONUs 1750 may be placed in any suitable location in the network, independently of the wavelength at which they transmit traffic, and the number of ONUs transmitting at a certain wavelength may be chosen freely. Particular deployment strategies and assignments of upstream wavelengths are discussed further below in conjunction with FIGS. 7 and 8.

In operation, in either a PSPON or an HPON, downstream traffic may be transmitted as discussed above in conjunction with FIGS. 1 and 3-5. In particular embodiments, transmitter(s) 1722 at OLT 1720 may transmit traffic in broadcast wavelengths, shared wavelengths, and/or dedicated wavelengths, depending on the type of PON. Filter 1729 may receive the transmitted downstream traffic and direct the traffic to RN 1740 over optical fiber 1730. RN 1740 may distribute the downstream traffic in any suitable manner (depending oil the type of PON) to each ONU 1740. Each filter 1770 at an ONU 1740 may receive downstream traffic from RN 1740 and direct this traffic to receiver(s) 1772. Receiver(s) 1772 may receive downstream traffic from filter 1770 and process the traffic in any suitable manner.

In the upstream direction, each transmitter 1782 in an ONU 1750 transmits upstream traffic at a particular wavelength (in the illustrated example, one of $\lambda_1$-$\lambda_4$). In particular embodiments, two or more ONUs 1750 may share transmission at a particular wavelength. For example, in the illustrated embodiment, ONUs 1750a and 1750c share transmission at $\lambda_2$, and ONUs 1750b and 1750n share transmission at $\lambda_1$. If more than one ONU 1750 shares transmission of upstream traffic in a particular wavelength, such ONUs 1750 may time-share transmission using any suitable communication protocol to avoid collision of upstream traffic. In particular embodiments, an ONU 1750 may transmit upstream traffic at multiple wavelengths, and one or more of these wavelengths may be shared among ONUs 1750. Filter 1770 receives the upstream traffic transmitted by transmitter 1782 and directs the traffic to RN 1740. RN 1740 receives the upstream traffic in the plurality of wavelengths from ONUs 1750, combines the traffic in the wavelengths at the primary power splitter, and forwards the combined traffic to OLT 1720.

At OLT 1720, filter 1729 receives the upstream traffic in the plurality of wavelengths, $\lambda_1$-$\lambda_4$, and directs this traffic to demultiplexer 1727. Demultiplexer 1727 receives this traffic, demultiplexes the constituent wavelengths $\lambda_1$-$\lambda_4$, and forwards traffic in each wavelength to a corresponding receiver, one of receivers 1723-1726. In the illustrated embodiment, demultiplexer 1727 forwards the traffic in $\lambda_1$-$\lambda_4$ to receivers 1723-1726, respectively. Each receiver of receivers 1723-1726 at OLT 1720 receives traffic in the associated wavelength and processes the traffic in a suitable manner. In particular embodiments, OLT 1720 may determine the number of ONUs 1750 sharing each upstream wavelength. This may allow network operators to manage ONU deployment more effectively, as described below.

In particular embodiments, upgraded network 1700 may provide increased upstream capacity cost-efficiently and reliably. Particular embodiments may also reuse many optical components, such as, for example, the remote node of the PON being upgraded. In particular embodiments, network operators may more closely tailor increases in upstream capacity with demand for that capacity than by, for example, upgrading to WDMPON. In particular embodiments, network operators may also implement different types of ONU deployment strategies, as described further below in conjunction with FIGS. 7 and 8. For example, ONUs may be deployed flexibly in any part of the network and may not be restricted to particular locations in the network.

Modifications, additions, or omissions may be made to the example network 1700 described without departing from the scope of the invention. The components of the example network 1700 described may be integrated or separated according to particular needs. Moreover, the operations of the example network 1700 described may be performed by more, fewer, or other components.

Figure 7:
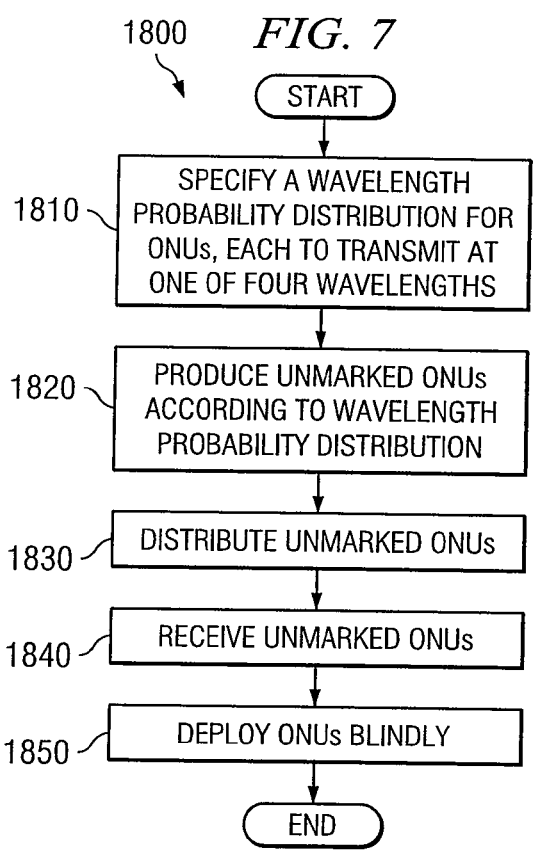
FIG. 7 is a flowchart illustrating an example method for deploying optical network units (ONUs) in an upgraded network.

FIG. 7 is a flowchart illustrating an example method 1800 for deploying ONUs in an upgraded network, such as network 1700 of FIG. 6. Each ONU referred to in method 1800 can be manufactured, for example, with one of four different transmitters to transmit upstream traffic (i.e., a $\lambda_1$ transmitter, a $\lambda_2$ transmitter, a $\lambda_3$ transmitter, and a $\lambda_4$ transmitter, as in network 1700 above). Thus, each ONU can be manufactured to transmit at one of $\lambda_1$-$\lambda_4$. In alternative embodiments, each ONU may be manufactured to transmit at one or more of any other suitable wavelengths. For example, each ONU could transmit at a single wavelength or at multi-wavelengths or be wavelength tunable (i.e., within a limited range). These ONUs may be manufactured (and/or later deployed) according to a specified wavelength probability distribution, as discussed further below.

Method 1800 begins at step 1810 where a wavelength probability distribution is specified for the ONUs. A wavelength probability distribution generally refers to the probability that any given ONU in a particular PON implementation transmits at a certain wavelength (i.e., that it is manufactured with a transmitter for that particular wavelength, that it is distributed with a transmitter for that particular wavelength, and/or that it is deployed with a transmitter for that particular wavelength). Thus, for example, assuming each ONU includes one transmitter and that each transmitter transmits at one of $\lambda_1$-$\lambda_4$, the wavelength probability distribution is the probability that any given ONU in a particular PON implementation transmits at one of $\lambda_1$-$\lambda_4$. A wavelength probability distribution may be specified, for example, by network operators and/or ONU manufacturers.

Particular wavelength probability distributions may be specified for particular reasons. For example, in particular embodiments, the wavelength probability distribution may be set such that any given ONU has an equal probability of transmitting at one of the wavelengths used. For example, if four wavelengths, $\lambda_1$-$\lambda_4$, are used, any given ONU may have an equal probability of transmitting at $\lambda_1$, $\lambda_2$, $\lambda_3$, or $\lambda_4$ in a particular PON implementation. In alternative embodiments, ONUs transmitting at particular wavelengths may have a greater distribution than ONUs transmitting at other wavelengths. For example, it may be advantageous in some GPONs to deploy less ONUs transmitting at 1311 nm than ONUs transmitting at other wavelengths (such as at other sub-bands of the 100 nm GPON standard). Deploying less 1311 nm ONUs may be advantageous, for example, in order to take into account other manufacturers' ONUs that may transmit only at 1311 nm. A wavelength probability distribution for new ONUs that accounts for other vendors' ONUs may produce an equal probability that any given ONU transmits at a particular wavelength used (increasing upstream bandwidth evenly across all users). Thus, a particular wavelength probability distribution may provide that any given ONU have an equal probability of transmitting at any wavelength used except for 1311 nm (whose specified wavelength distribution would be less).

At step 1820, the ONUs may be produced according to the specified wavelength probability distribution. In particular embodiments, the wavelength at which an ONU transmits upstream traffic may not be marked on the ONU. In these embodiments, there may also be no correlation between transmitted wavelength and serial number. In alternative embodiments, the ONUs may be identified by wavelength transmitted. At step 1830, the ONUs may be distributed to network operators or other suitable customers in, for example, a random order (one not correlated with wavelengths transmitted). Alternatively to steps 1820 and 1830, ONUs may be produced according to the specified wavelength probability distribution and may be distributed to network operators in any order (i.e., a non-random order). Network operators may then deploy the ONUs in a random order, as discussed below at step 1850. In other alternative embodiments to steps 1820 and 1830, ONUs may be produced in any suitable manner (including one not according to the specified wavelength probability distribution) and may be distributed to network operators according to the specified wavelength probability distribution. Network operators may then deploy the ONUs in a random order, as discussed below.

At step 1840, the ONUs may be received by the network operators or other suitable customers. At step 1850, the ONUs may be deployed in the PON without regard to the wavelength at which the ONU transmits (i.e., "blindly"). In other words, network operators may deploy ONUs without managing how many ONUs transmit at particular upstream wavelengths. For example, network operators may deploy ONUs in a random manner without regard for the wavelength at which the sold ONUs transmit, trusting that the ONUs will be implemented in a PON according to the specified wavelength probability distribution. An example of deploying in a random manner may include selling unmarked ONUs at a supermarket, each ONU transmitting at one of a set of "residential" wavelength bands, the purchaser/end-user plugging the purchased ONU into the network. In particular embodiments, this particular method of deployment may be especially attractive to residential users who may not need guaranteed or premium upstream capacity.

In particular embodiments, the random deployment of ONUs to users most likely corresponds closely to the wavelength probability distribution specified. Thus, in particular embodiments, network operators may guarantee increased bandwidth corresponding to the wavelength probability distribution to ONU users. The increased bandwidth may be relative to the upstream bandwidth being upgraded from (such as that provided by a typical GPON ONU). Although a situation where all users in a network transmit at the same upstream wavelength may arise (if, for example, all receive ONUs with the same transmitter), the probability of such a situation may be quite small. In such a situation, ONUs may be selectively replaced to provide a distribution of ONUs that more closely corresponds to the specified wavelength probability distribution. Network operators may be notified of such a need to replace particular ONUs by, for example, OLT management software that may determine that the number of users in a PON transmitting at the same upstream wavelength is above a threshold.

It should be noted that, in particular embodiments, the wavelength probability distribution could be changed over time (i.e., a new distribution specified). For example, initially, the probability distribution could include a certain probability of receiving a 1310 nm transmitter. If the network were to become, for example, 50% subscribed, the probability distribution could be changed to reduce the probability of receiving a 1310 nm transmitter to a lower probability (i.e., a 0% probability). It should further be noted that in particular embodiments, one type of ONU may transmit upstream traffic at two or more wavelengths (i.e., if the ONU comprises more than one transmitter), the wavelength probability distribution may take into account this type of multi-wavelength ONU, and users may transmit upstream traffic at one or more of the wavelengths in any suitable manner.

Modifications, additions, or omissions may be made to the example method 1800 described without departing from the scope of the invention. The components of the example method 1800 described may be integrated or separated according to particular needs. Moreover, the operations of the example method 1800 described may be performed by more, fewer, or other components.

Figure 8:
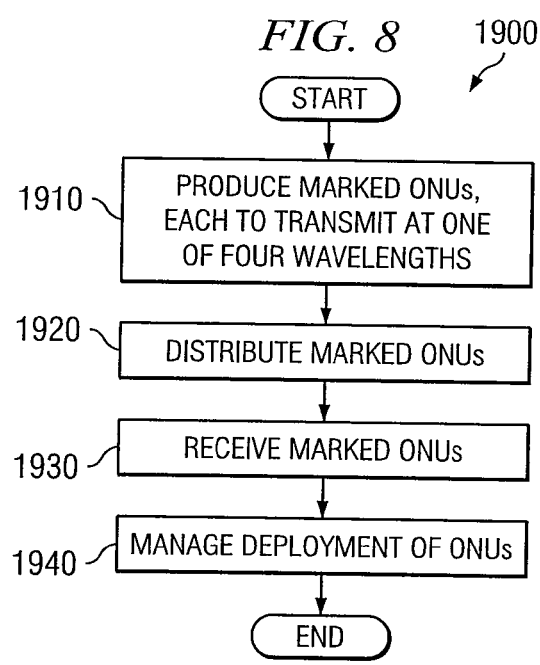
FIG. 8 is a flowchart illustrating another example method for deploying ONUs in an upgraded network.

FIG. 8 is a flowchart illustrating another example method 1900 for deploying ONUs in an upgraded network, such as network 1700 of FIG. 6. In method 1900, unlike in method 1800, deployment of particular ONUs transmitting at particular wavelengths is managed. Method 1900 begins at step 1910, where multiple ONUs are produced, each ONU operable to transmit upstream traffic at a particular wavelength from a set of wavelengths. For example, in particular embodiments, each ONU may be operable to transmit at one of four different wavelengths. Each ONU may be marked with the wavelength at which its transmitter transmits. At steps 1920 and 1930, the marked ONUs are distributed to and are received by network operators.

At step 1940, each network operator may manage the deployment of the marked ONUs in any suitable manner. For example, a hierarchy of ONUs may be established from premium service ONUs at the top of the hierarchy to standard service ONUs at the bottom of the hierarchy. In particular embodiments, particular wavelengths (and thus particular ONUs) may be reserved for premium service. These wavelengths may be used by less ONUs in a PON and provide greater bandwidth per ONU than those wavelengths used for standard service, which more ONUs may use. A network operator may guarantee a certain amount of bandwidth to these premium users in particular embodiments. Besides reserving wavelengths for premium users, wavelengths may also be reserved for special applications.

In alternative embodiments, wavelengths may be deployed based on statistical information associated with an existing user base. For example, in typical GPONs, the 1311 nm wavelength is used by ONUs for upstream transmission. Some or all of these ONUs may be replaced by ONUs that transmit at, for example, 1271, 1291, 1331 and/or 1351 nm. These new ONUs may be produced for and used by premium users, increasing the upstream bandwidth available to these premium users (and increasing upstream bandwidth of typical ONUs as a by-product of some ONUs in the network being replaced to transmit at new wavelengths).

In alternative embodiments, deployment of marked ONUs may be managed differently. For example, particular wavelengths may be reserved for residential customers, particular wavelengths may be reserved for business customers, and particular wavelengths may be reserved for premium business customers. In particular embodiments, less ONUs transmitting at a particular wavelength would be deployed in a PON to those users promised greater bandwidth, and more ONUs transmitting at a different wavelength would be deployed in the PON to those users promised less bandwidth.

It should be noted that, in particular embodiments, multi-wavelength ONUs (generally referring to as ONUs that may transmit at two or more wavelengths) may be produced, distributed to and received by network operators, and deployed to users according to a suitable deployment scheme. For example, dual transmitter ONUs may be deployed to business users. These users may transmit upstream traffic at one or both wavelengths, as need for upstream bandwidth dictates, for example.

Modifications, additions, or omissions may be made to the example method 1900 described without departing from the scope of the invention. The components of the example method 1900 described may be integrated or separated according to particular needs. Moreover, the operations of the example method 1900 described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for deploying optical network units (ONUs) in a passive optical network (PON), comprising:
  receiving a plurality of ONUs for deployment into the PON, the ONUs received according to a specified wavelength probability distribution, the wavelength probability distribution indicating the probability that any given received ONU will transmit at one of a set of wavelengths comprising at least a first wavelength and a second wavelength when deployed in the PON; and
  deploying the ONUs in the PON without regard to the wavelength at which the ONU transmits.

2. The method of claim 1, wherein each received ONU does not identify the wavelength at which the ONU transmits.

3. The method of claim 1, further comprising, before receiving the plurality of ONUs:
  specifying the wavelength probability distribution;
  producing the plurality of ONUs; and
  distributing the plurality of ONUs.

4. The method of claim 3, wherein the plurality of ONUs are produced according to the specified wavelength probability distribution and distributed without regard to the wavelength at which the ONU transmits.

5. The method of claim 3, wherein the plurality of ONUs are distributed according to the specified wavelength probability distribution.

6. The method of claim 1, wherein the specified wavelength probability distribution indicates that a substantially equal number of ONUs transmitting at each wavelength in the set of wavelengths should be deployed.

7. The method of claim 1, wherein the specified wavelength probability distribution indicates that more ONUs transmitting at one of the set of wavelengths should be deployed than ONUs transmitting at least one other of the set of wavelengths.

8. A method for deploying optical network units (ONUs) in a passive optical network (PON), comprising:
  receiving a first set of a plurality of ONUs, each ONU in the first set operable to transmit upstream traffic at a first wavelength, each ONU in the first set being identified as transmitting at the first wavelength;
  receiving a second set of a plurality of ONUs, each ONU in the second set operable to transmit upstream traffic at a second wavelength, each ONU in the second set being identified as transmitting at the second wavelength; and
  managing the deployment of the ONUs based on the wavelength at which each ONU transmits to ensure a particular distribution in the PON of ONUs in each of at least the first and second sets of ONUs, wherein the particular distribution of ONUs in each set in the PON is determined based on information associated with ONUs already deployed in the PON before the first and second sets of ONUs are received.

9. The method of claim 8, wherein the particular distribution of ONUs in each set in the PON comprises a greater number of ONUs in the first set than of ONUs in the second set in the PON.

10. The method of claim 8, wherein the particular distribution of ONUs in each set in the PON comprises an equal number of ONUs in each set in the PON.

* * * * *